US012774712B2

(12) United States Patent
Wakibayashi et al.

(10) Patent No.: US 12,774,712 B2
(45) Date of Patent: Oct. 27, 2026

(54) JOINING MEMBER AND ASSEMBLABLE FRAME

(71) Applicant: MOLTEN CORPORATION, Hiroshima (JP)

(72) Inventors: Kazuyuki Wakibayashi, Hiroshima (JP); Jun Uchida, Hiroshima (JP)

(73) Assignee: MOLTEN CORPORATION, Hiroshima (JP)

( * ) Notice: Subject to any disclaimer, the term of this patent is extended or adjusted under 35 U.S.C. 154(b) by 169 days.

(21) Appl. No.: 18/497,416

(22) Filed: Oct. 30, 2023

(65) Prior Publication Data

US 2024/0060521 A1 Feb. 22, 2024

(51) Int. Cl.
*F16B 7/18* (2006.01)
*A47B 47/00* (2006.01)
(Continued)

(52) U.S. Cl.
CPC ............. *F16B 7/18* (2013.01); *A47B 47/005* (2013.01); *A47B 96/06* (2013.01); *F16B 9/052* (2018.08)

(58) Field of Classification Search
CPC .. F16B 7/18; F16B 7/182; F16B 7/185; F16B 7/22; F16B 9/05; F16B 9/052;
(Continued)

(56) References Cited

U.S. PATENT DOCUMENTS

| | | | | |
|---|---|---|---|---|
| 368,506 A * | 8/1887 | Berrien | ..................... | E06B 9/52 160/379 |
| 3,256,030 A * | 6/1966 | Banse | ................... | E04B 1/2608 52/712 |

(Continued)

FOREIGN PATENT DOCUMENTS

| | | |
|---|---|---|
| CN | 205682004 U | 11/2016 |
| DE | 202004001941 U1 | 9/2004 |

(Continued)

OTHER PUBLICATIONS

China National Intellectual Property Administration; Office Action for CN100738 dated Feb. 6, 2026 Feb. 6, 2026.

(Continued)

*Primary Examiner* — Amber R Anderson
*Assistant Examiner* — Kevin J Baynes
(74) *Attorney, Agent, or Firm* — Parsons Behle & Latimer

(57) ABSTRACT

A joining member includes a first support portion supporting a first pole member in the longitudinal direction at the bottom surface, a second support portion supporting a second pole member in the longitudinal direction at the bottom surface, a first contact portion located on one side of the first support portion along the longitudinal direction of the first pole member and contacting the first pole member at the side surface, and a second contact portion located on one or the other side of the second support portion along the longitudinal direction of the second pole member and contacting the second pole member at the side surface. The first support portion and/or the first contact portion has a through portion in the bottom surface or the side surface. The second support portion and/or the second contact portion has a through portion in the bottom surface or the side surface.

10 Claims, 20 Drawing Sheets

(51) Int. Cl.
*A47B 96/06* (2006.01)
*F16B 9/00* (2006.01)

(58) Field of Classification Search
CPC ........ F16B 9/058; F16B 12/50; A47B 47/005; A47B 47/027; A47B 47/028; A47B 96/06; A63B 61/04; A63B 63/004; A63B 2063/005; A63B 2063/006
See application file for complete search history.

(56) References Cited

U.S. PATENT DOCUMENTS

| | | | | | |
|---|---|---|---|---|---|
| 4,267,682 | A * | 5/1981 | Fowler | E04B 1/08 | 403/231 |
| 5,176,348 | A * | 1/1993 | Gale | F16B 12/44 | 52/657 |
| 5,326,337 | A * | 7/1994 | Pardella | A63B 9/00 | 403/49 |
| 5,399,044 | A | 3/1995 | Gilb | | |
| 5,664,784 | A * | 9/1997 | Redlich | A63B 63/00 | 273/400 |
| 5,902,194 | A * | 5/1999 | Wade | A63B 63/00 | 273/400 |
| 6,383,096 | B1 * | 5/2002 | Green | A63B 63/004 | 473/415 |
| 6,561,931 | B1 * | 5/2003 | Reeves | A63B 63/004 | 403/102 |
| 6,579,196 | B1 * | 6/2003 | Yoon | A63B 71/023 | 473/421 |
| 6,929,227 | B2 * | 8/2005 | Hofmann | F16B 3/06 | 403/14 |
| 7,364,146 | B2 * | 4/2008 | Witte | F16B 7/18 | 269/45 |
| 8,246,494 | B2 * | 8/2012 | Stephenson | A63B 63/004 | 473/422 |
| 8,671,644 | B2 * | 3/2014 | Huang | A47B 13/06 | 403/172 |
| 8,720,839 | B2 * | 5/2014 | Lijesnic | A47B 47/0033 | 403/231 |
| 9,961,995 | B2 * | 5/2018 | Kam | A47B 47/028 | |
| 2004/0124319 | A1 | 7/2004 | Hofmann et al. | | |
| 2005/0209028 | A1 * | 9/2005 | Tsai | A63B 61/04 | 473/493 |
| 2008/0203262 | A1 * | 8/2008 | Sparks | F16B 12/44 | 248/346.01 |
| 2009/0124435 | A1 * | 5/2009 | Ferrone | A63B 63/004 | 473/478 |
| 2013/0249363 | A1 | 9/2013 | Liu | | |
| 2014/0308067 | A1 * | 10/2014 | Boudeman | F16B 11/008 | 144/333 |

FOREIGN PATENT DOCUMENTS

| | | | | |
|---|---|---|---|---|
| DE | 202012005057 | U1 * | 7/2012 | F16B 12/40 |
| FR | 2846058 | A1 * | 4/2004 | F16B 5/0692 |
| JP | H094056 | A | 1/1997 | |
| JP | 2002253722 | A | 9/2002 | |
| JP | 2003038264 | A | 2/2003 | |
| TW | M413041 | U | 10/2011 | |

OTHER PUBLICATIONS

China National Intellectual Property Administration; Office Action for CN100738 dated Aug. 27, 2026.

* cited by examiner

FIG.26
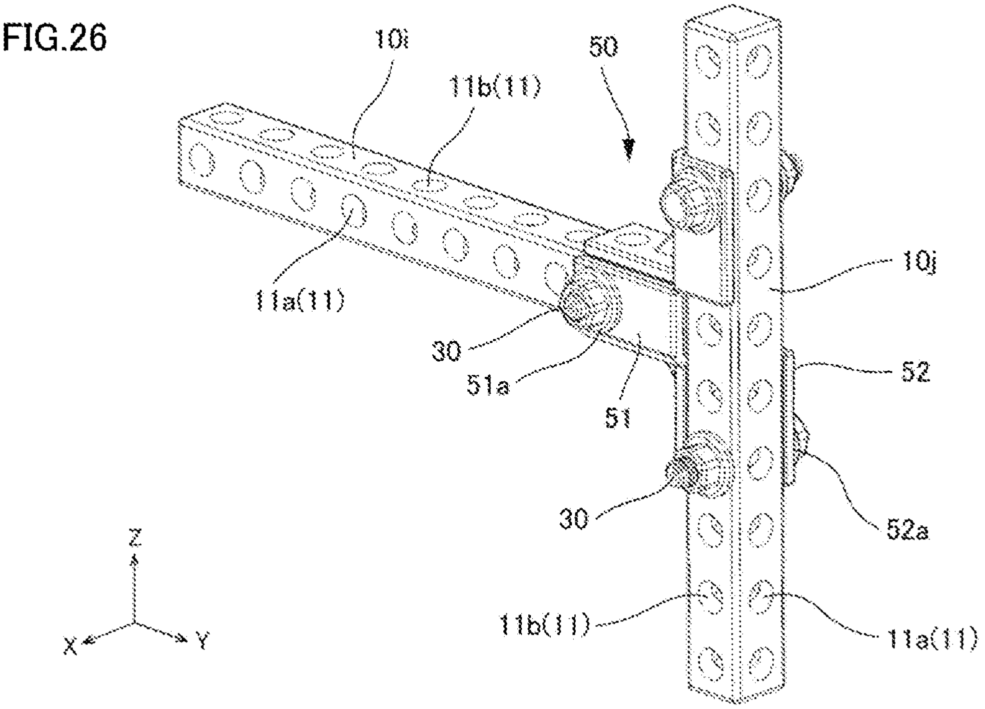
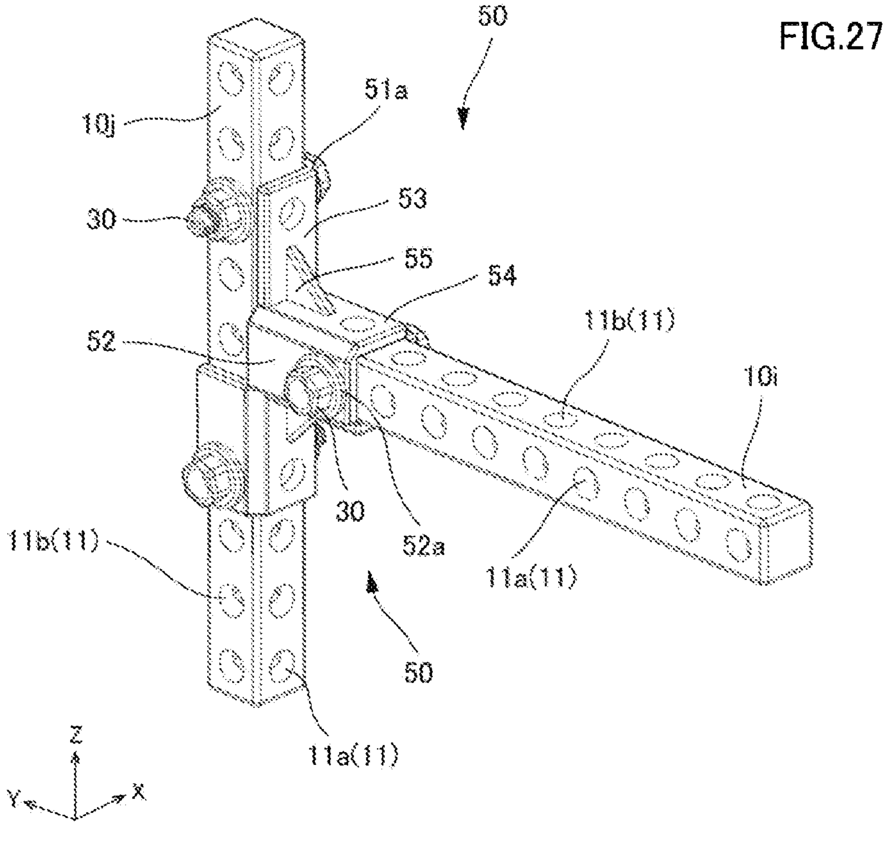
FIG.27

JOINING MEMBER AND ASSEMBLABLE FRAME

CROSS-REFERENCE TO RELATED APPLICATION

This application is a continuation of PCT International Application No. PCT/JP2022/018397, filed on Apr. 21, 2022, which claims the benefit of priority from Japanese Patent Application No. 2021-088069, filed on May 26, 2021; the entire contents of which are incorporated herein by reference.

FIELD

Embodiments described herein relate generally to a joining member and an assemblable frame.

BACKGROUND

There have conventionally been assemblable frames formed of a plurality of pole members connected by joining members (corner members). Such an assemblable frame is used, for example, as a goal for ball games such as football, handball, and hockey, or as a target for baseball or golf practice, by placing a net on the assembled frame. Assemblable frames may be used indoors as well as outdoors, not only for competition but also for recreational games such as a mini-football game. As an example of an assemblable frame used as a goal or a target for ball games, Patent Document 1 proposes a modular sports net assembly.

Specifically, Patent Document 1 discloses a modular sports net assembly configured to be placed on relatively flat ground and easily assembled and disassembled for storage. The net assembly includes a tubular frame structure formed in the shape of a square pole with a plurality of intermediate pole segments interconnecting a plurality of corner units (joining members). Each of the corner units has protruding pole-receiving portions extending along at least three independent axes. Each of the pole-receiving portions receives an end of an intermediate pole segment.

As another example, there have been assemblable frames used as a shelf or stand for placing various items by laying a shelf board across the assembled frame, or a storage box for storing various items by placing or not placing a wall plate around the frame. As such an assemblable frame for placing or storing, for example, Patent Document 2 discloses a combined frame for an electromechanical box.

The combined frame for an electromechanical box disclosed in Patent Document 2 can be disassembled and easily assembled. The combined frame includes an upper frame formed of four transversal beams and four corner members (joining members) at the top, and a lower frame formed of four transversal beams and four corner members at the bottom. The upper frame and the lower frame are connected through four longitudinal columns. Each of the corner members connects two adjacent transversal beams by screwing, and minor connectors are provided on both upper and lower ends of each of the longitudinal columns.

Patent Document 1: Japanese Unexamined Patent Application Publication No. 2002-253722

Patent Document 2: Japanese Utility Model No. 3179243

As described above, the corner units of Patent Document 1 each have protruding pole-receiving portions extending along at least three independent axes (vertical and two horizontal directions) and are not in a form for connecting two pole members.

Although having a different form, the corner members of Patent Document 2 are similar to the corner units of Patent Document 1 in that they each connect three pole members extending in a vertical direction and two horizontal directions.

Therefore, in the assemblable frames of Patent Documents 1 and 2, when the joining member is used to connect only two pole members, the portion provided for the third pole member is exposed in an unused state, which constitutes an obstacle in use. In addition, it is necessary to prepare another joining member to connect only two pole members without excess or deficiency. The above problems apply not only to the "net assembly" disclosed in Patent Document 1 and the "box" disclosed in Patent Document 2, but also to all joining members used in the assembly of goal sets, shelves, chairs, tables, playground equipment (swings, jungle gyms, etc.), and the like, when they are formed from an assemblable frame.

The present disclosure has been made to, at least to some extent, overcome the above disadvantages and to provide a joining member capable of easily and reliably connecting pole members regardless of the number of pole members with one form and an assemblable frame using the joining member.

BRIEF SUMMARY OF THE INVENTION

In general, according to one embodiment, a joining member configured to connect a plurality of pole members includes: a first support portion that supports a first pole member in the longitudinal direction thereof at the bottom surface; a second support portion that is connected to the first support portion so as to intersect the first support portion and supports a second pole member in the longitudinal direction thereof at the bottom surface on the reflex angle side as viewed from the bottom surface of the first support portion; a first contact portion that is located on one side of the first support portion along the longitudinal direction of the first pole member and contacts the first pole member at the side surface; and a second contact portion that is located on one or the other side of the second support portion along the longitudinal direction of the second pole member and contacts the second pole member at the side surface. At least either the first support portion or the first contact portion has a through portion in the bottom surface or the side surface. At least either the second support portion or the second contact portion has a through portion in the bottom surface or the side surface.

In some embodiments, the first support portion and the second support portion may have at least one through portion and one convex portion in their respective bottom surfaces, and the first contact portion and the second contact portion may have at least one through portion and one convex portion in their respective side surfaces.

In some embodiments, the first support portion, the second support portion, the first contact portion, and the second contact portion may be formed in a flat plate shape.

In other embodiments, the first support portion, the second support portion, the first contact portion, and the second contact portion may be formed in a curved plate shape.

According to another embodiment, an assemblable frame includes: a plurality of pole members; and the above-described joining member which connects the pole members.

BRIEF DESCRIPTION OF THE DRAWINGS

FIG. 26 is a front perspective view for explaining the assembly of the joining member and pole members according to the third embodiment;

FIG. 27 is a rear perspective view for explaining the assembly of the joining member and the pole members;

DETAILED DESCRIPTION

Hereinafter, exemplary embodiments will be described in detail with reference to the accompanying drawings. In the following, the front-rear direction is referred to as the X direction, the left-right direction or horizontal direction is referred to as the Y direction, and the top-bottom direction or vertical direction is referred to as the Z direction. Note that the three directions are relative to one another.

(Example of Assemblable Frame)

An example of an assemblable frame 1 using joining members 20 of a first embodiment (described later) will be described with reference to FIGS. 1 to 7. As illustrated in FIGS. 1 to 7, the assemblable frame 1 includes a plurality of pole members 10 and a plurality of joining members 20 that connect the pole members 10. The pole members 10 and the joining members 20 are fastened together with bolts/nuts 30. Details of the joining members 20 used in the first embodiment will be described later in another section.

Figure 1:
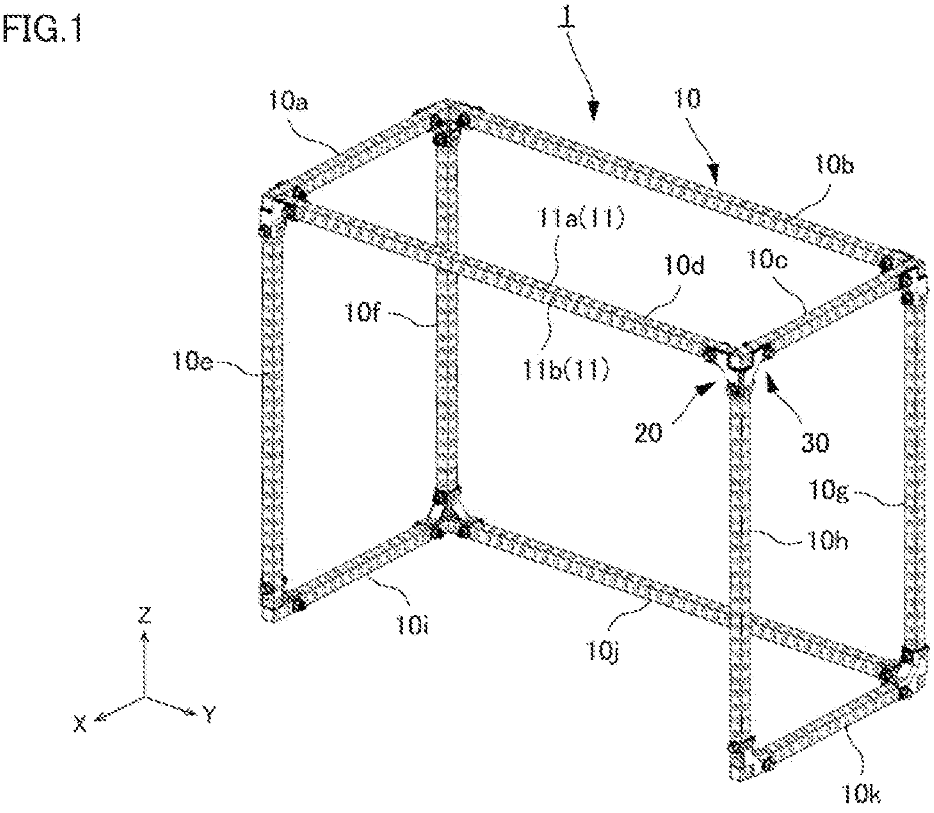
FIG. 1 is a front perspective view illustrating an example of an assemblable frame using a joining member according to a first embodiment.
Figure 2:
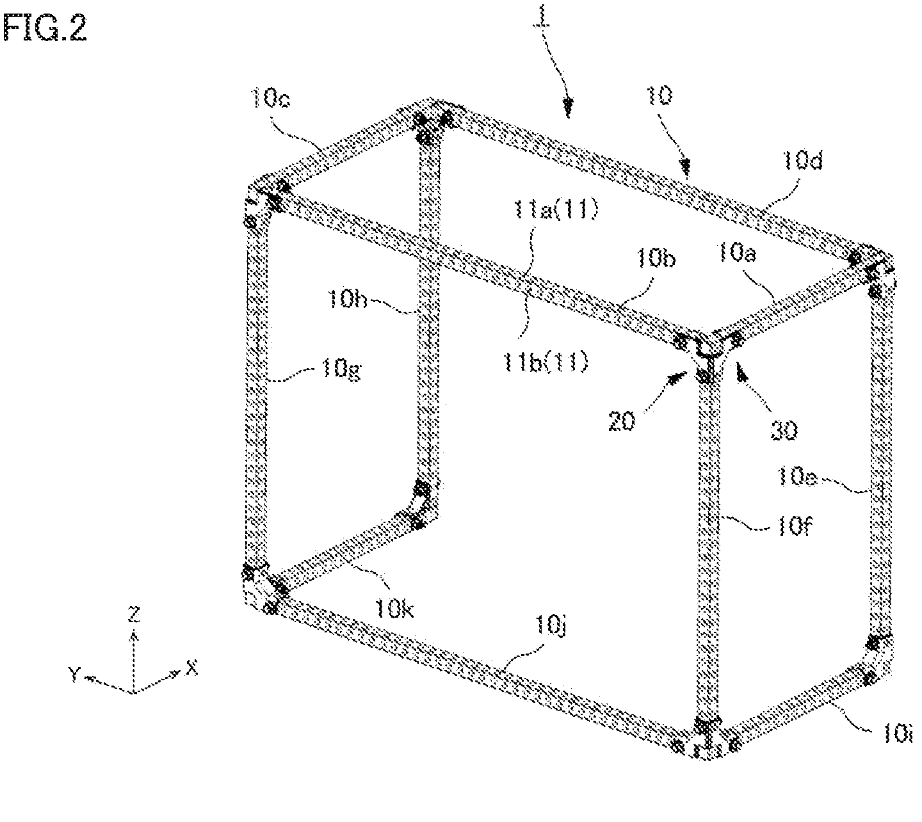
FIG. 2 is a rear perspective view of the assemblable frame.
Figure 3:
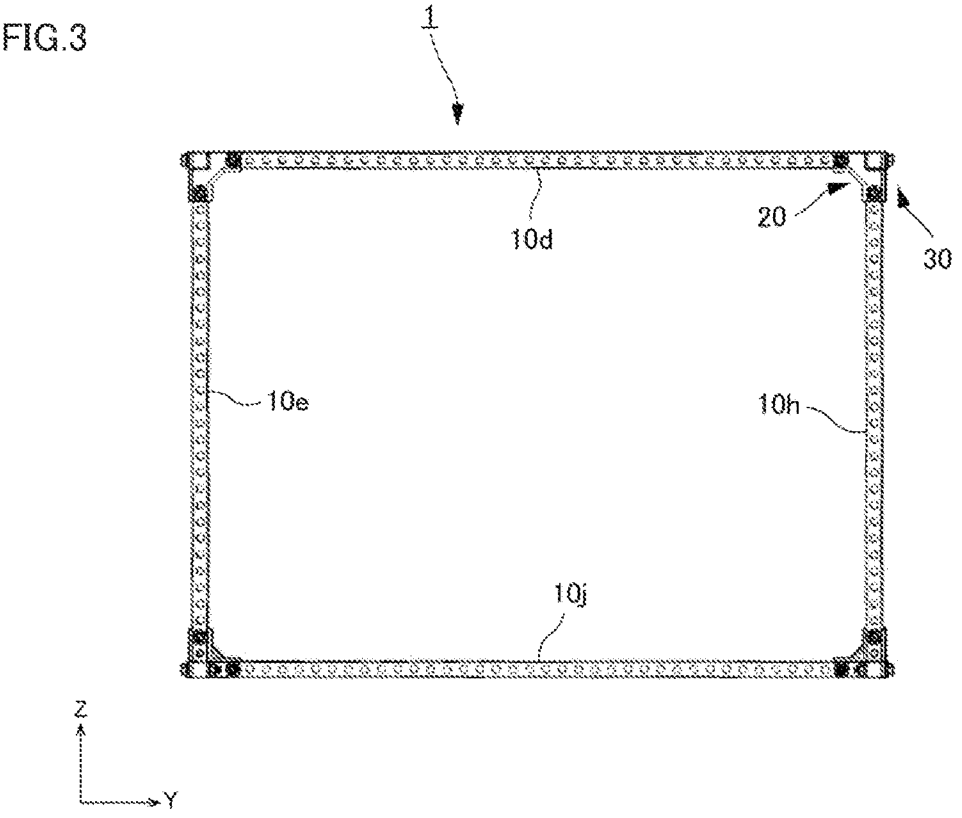
FIG. 3 is a front view of the assemblable frame.
Figure 4:
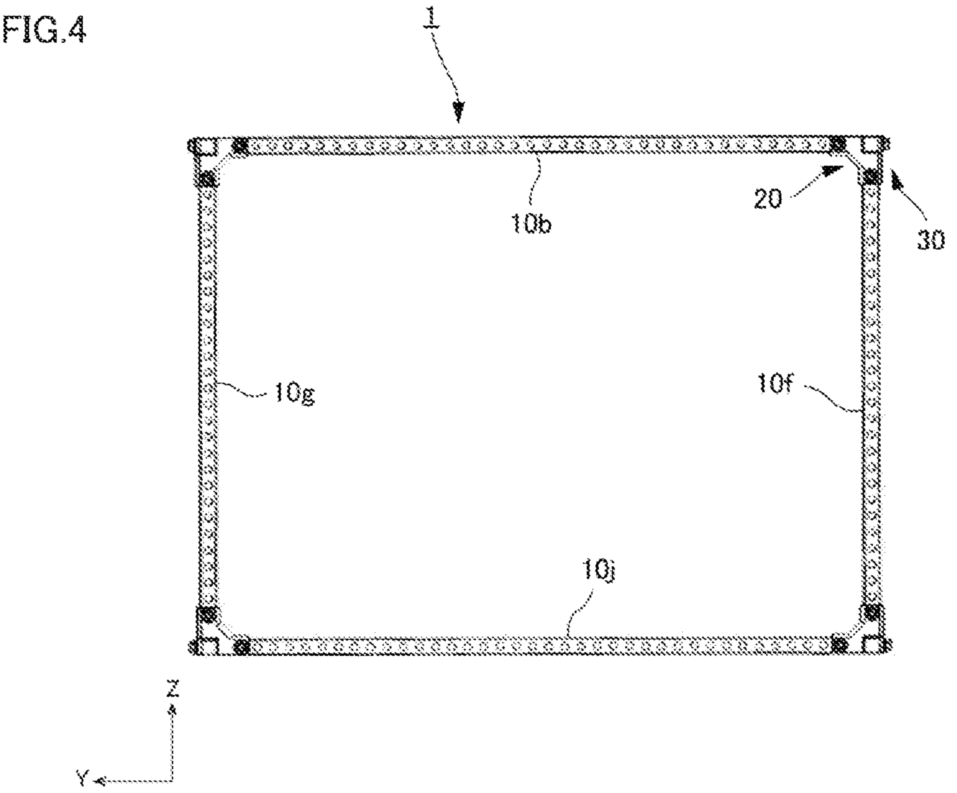
FIG. 4 is a rear view of the assemblable frame.
Figure 5:
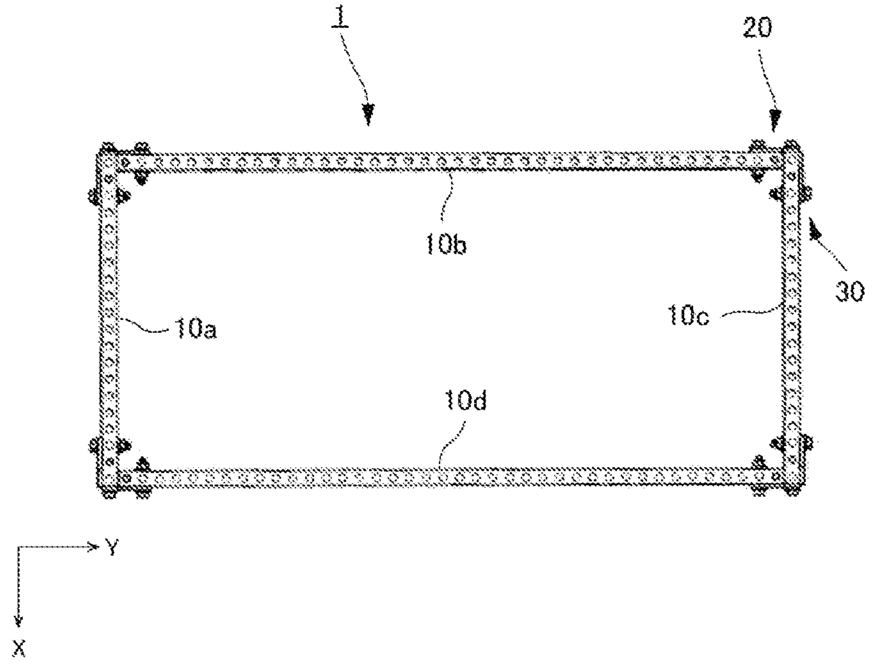
FIG. 5 is a plan view of the assemblable frame.
Figure 6:
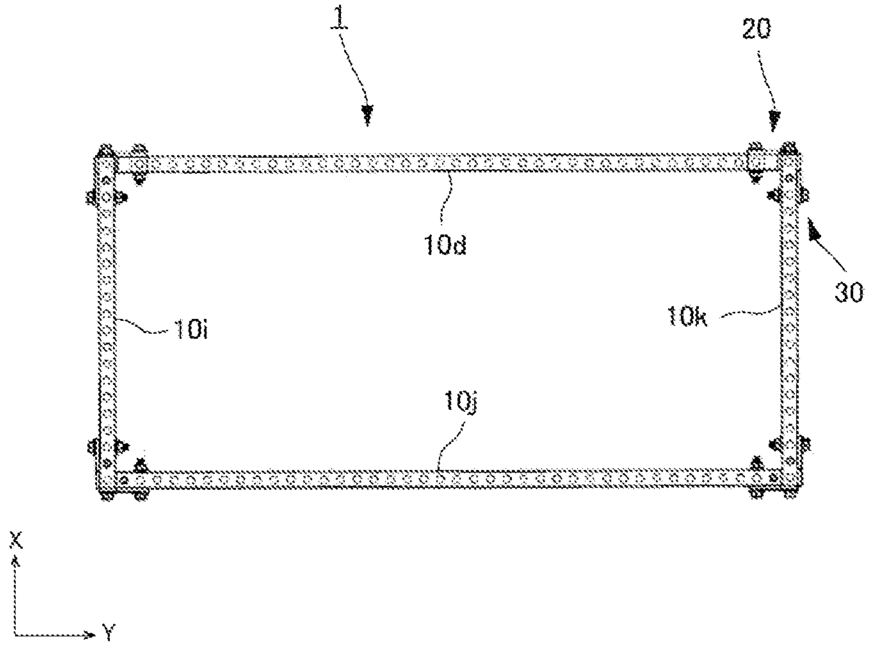
FIG. 6 is a bottom view of the assemblable frame.
Figure 7:
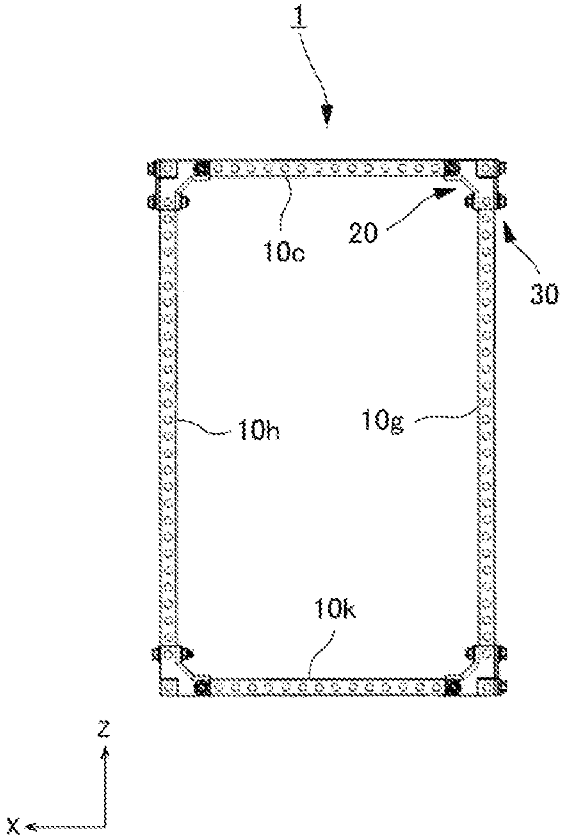
FIG. 7 is a right-side view of the assemblable frame.

FIGS. 1 to 7 illustrate the assemblable frame 1: FIG. 1 is a front perspective view, FIG. 2 is a rear perspective view, FIG. 3 is a front view, FIG. 4 is a rear view, FIG. 5 is a plan view, FIG. 6 is a bottom view, and FIG. 7 is a right-side view. Incidentally, the left-side view is symmetrical with the right-side view of FIG. 7.

The assemblable frame 1 illustrated in FIGS. 1 to 7 is assumed to be a goal set used in a mini-football game as an example. However, the assemblable frame 1 is not limited thereto, and may be a goal for other ball games such as football, handball, and hockey, or a target for baseball or golf practice. The assemblable frame 1 can also be used as a shelf or stand for placing various items by laying a shelf board across the assembled assemblable frame 1, or a storage box for storing various items by placing or not placing a wall plate around the frame. In addition, the assemblable frame 1 may be applied to frames for various objects such as chairs, tables, and playground equipment (swings, jungle gyms, etc.).

Referring to FIGS. 1 to 7, when viewed from the front (in the X direction), there are a total of 11 pole members including: an upper left pole member 10*a*, an upper rear pole member 10*b*, an upper right pole member 10*c*, an upper front pole member 10*d*, a vertical left front pole member 10*e*, a vertical left rear pole member 10*f*, a vertical right rear pole member 10*g*, a vertical right front pole member 10*h*, a lower left pole member 10*i*, a lower rear pole member 10*j*, and a lower right pole member 10*k*. Since the assemblable frame 1 is assumed to be a goal for a mini-football game, there is no pole member 10 in the lower front. When used as a goal, the assemblable frame 1 is covered with a net on the top, left and right sides, and back, except for the front. In the following, when the pole members 10 are described without specifying their positions, they are designated by the reference character "10", and when a pole member (10) at a specific position is described, it is designated by the reference character "10*a*" or the like.

The pole members 10 are connected one to another by the joining members 20. Specifically, at the six corners where the pole member 10*a* is connected to the pole member 10*d* and the pole member 10*e*, the pole member 10*a* is connected to the pole member 10*b* and the pole member 10*f*, the pole member 10*b* is connected to the pole member 10*c* and the pole member 10*g*, the pole member 10*c* is connected to the pole member 10*d* and the pole member 10*h*, the pole member 10*i* is connected to the pole member 10*j* and the pole member 10*f*, and the pole member 10*j* is connected to the pole member 10*k* and the pole member 10*g*, three pole members 10 are connected by two joining members 20. Meanwhile, at the two corners where the pole members 10*e* and 10*i* are connected, and the pole members 10*h* and 10*k* are connected, two pole members 10 are connected by one joining member 20.

One joining member 20 (first joining member) connects two pole members 10 (first pole member and second pole member), as will be described later in detail. At the above-described six corners where three pole members 10 meet, another joining member 20 (second joining member) is used to connect the third pole member 10 (third pole member) to one of the two pole members 10 (first pole member or second pole member) connected by the first joining member.

Each of the pole members 10 has pole through portions 11 each passing through a pair of opposing surfaces and intersecting another through portion in a cross-sectional view. In FIGS. 1 and 2, the pole through portions 11 which penetrate one pair of surfaces are designated by the reference character "11*a*", and the pole through portions 11 which penetrate the other pair of surfaces are designated by the reference character "11*b*". As will be described later, the pole through portions 11 are used for fastening by the bolts/nuts 30 in correspondence with through portions 21*a* and the like formed in the joining members 20, or they are used for fitting with convex portions 21*b* and the like formed in the joining members 20.

Note that the through portion formed in the pole member is referred to herein as "pole through portion", while the through portion formed in the joining member is simply referred to as "through portion". If necessary, the through portion and the convex portion may also be referred to as, for example, "through portion 21*a* (first contact through portion)" and "convex portion 21*b* (first contact convex portion)", respectively, indicating a part where they are formed.

In addition, the pole through portions 11 can be used to attach a net by tying an attachment string when the assemblable frame 1 is used as a goal or target, or to place a shelf board when the assemblable frame 1 is used as a shelf or a storage box. When the assemblable frame 1 is used as a goal or target, a string or rope made of a material suitable for a net can be woven into a net shape by passing it through the pole through portions 11 in the vertical and horizontal pole members 10. Furthermore, when the assemblable frame 1 is used, for example, for a chair, the seat and the backrest can be formed by passing a string or wide cloth through the pole through portions 11 of the vertical and horizontal pole members 10 in the parts to be the seat and the backrest. In this manner, the assemblable frame 1 can be used for various purposes by passing strings, ropes, wide cloth, or the like through the pole through portions 11 of the pole members 10.

The material of the pole members 10 is not particularly limited and may be wood, metal, or resin. Under the conditions of use for recreational games such as a mini-football game or for indoor use, wood can be suitably used because of its moderate weight, ease of manufacture, and ease of assembly; however, steel, polyvinyl chloride (PVC), and the like may also be used. Although the pole members 10 are illustrated in FIGS. 1 to 27 as having a square cross-section, the shape of the pole members 10 is not limited thereto. The cross-section of the pole members may be square with rounded or truncated corners, hexagonal, or circular. When the pole members 10 have a square cross-section, the two pole through portions 11*a* and 11*b* intersect each other in a cross shape in a cross-sectional view. When the pole members 10 have a hexagonal cross-section, two pole through portions such as the pole through portions 11*a* and 11*b* may intersect each other in an X shape, and if the number of through portions is increased by one to three, they may intersect one another in an asterisk (*) shape. When the pole members 10 have a circular cross-section, the desired number of through portions may intersect each other in a cross shape, an X shape, or an asterisk (*) shape.

Described below is an example where the pole members are made of wood. For example, 2×2 (38 mm×38 mm) lumbers with a square cross-section or 2×4 (38 mm×89 mm) lumbers with a rectangular cross-section may be used; however, square lumbers have better assembly workability because they can be assembled regardless of their orientation. FIGS. 1 to 27 illustrate an example of using 2×2 lumbers, where the first pole through portion 11*a*, 11*b* is located at a distance of 19 mm, which is ½ of 38 mm, from the end of the pole member 10, and the pitch between the pole through portions 11*a*, 11*b* is 38 mm. By positioning the first pole through portion 11*a*, 11*b* at a distance of 19 mm from the end, the pole members 10 can be neatly connected without gaps when connected in a T-shape. However, the arrangement of the pole through portions is not limited thereto. In the case where the pole members 10 are square lumbers having a square cross-section, it is possible to connect them in a state close to an arbitrary position when the first pole through portion 11*a*, 11*b* is located at a distance of ½ of the side length from the end, and the pitch between the pole through portions 11*a*, 11*b* is set to the side length. Assuming that 2×2 lumbers are used as the pole members 10, the distance between the through portion 21*a* and the convex portion 21*b* in the joining member 20 (40, 50, 60) described below is set to 38 mm to match the pitch between the pole through portions 11*a*, 11*b*.

Joining Member of First Embodiment

Next, the joining member 20 according to the first embodiment will be described with reference to FIGS. 8 to 15. As illustrated in FIGS. 8 to 15, the joining member 20 includes a first contact portion 21, a second contact portion 22, a first support portion 23, a second support portion 24, and a reinforcement portion 25. Assuming that the pole members 10 each have a square cross-section, in the joining member 20, the first support portion 23, the second support portion 24, the first contact portion 21, and the second contact portion 22 are formed in a flat plate shape. Although this embodiment provides an example in which the joining member 20 includes the reinforcement portion 25, the reinforcement portion 25 may be provided as necessary in consideration of the application of the assemblable frame 1 and the material and strength of the joining member 20. The same applies to joining member 40 of a second embodiment, joining member 50 of a third embodiment, and joining member 60 of a fourth embodiment (described later).

Figure 8:
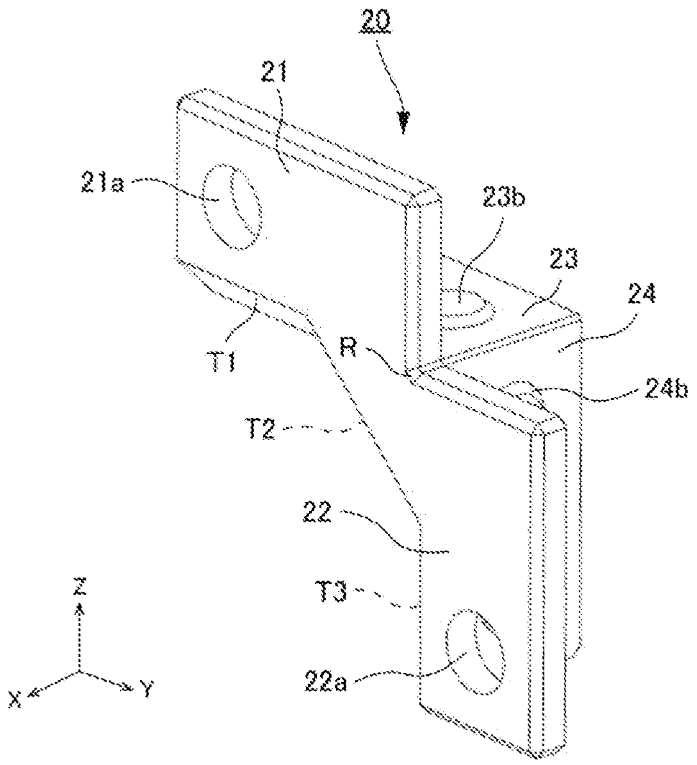
FIG. 8 is a front perspective view of the joining member according to the first embodiment.
Figure 9:
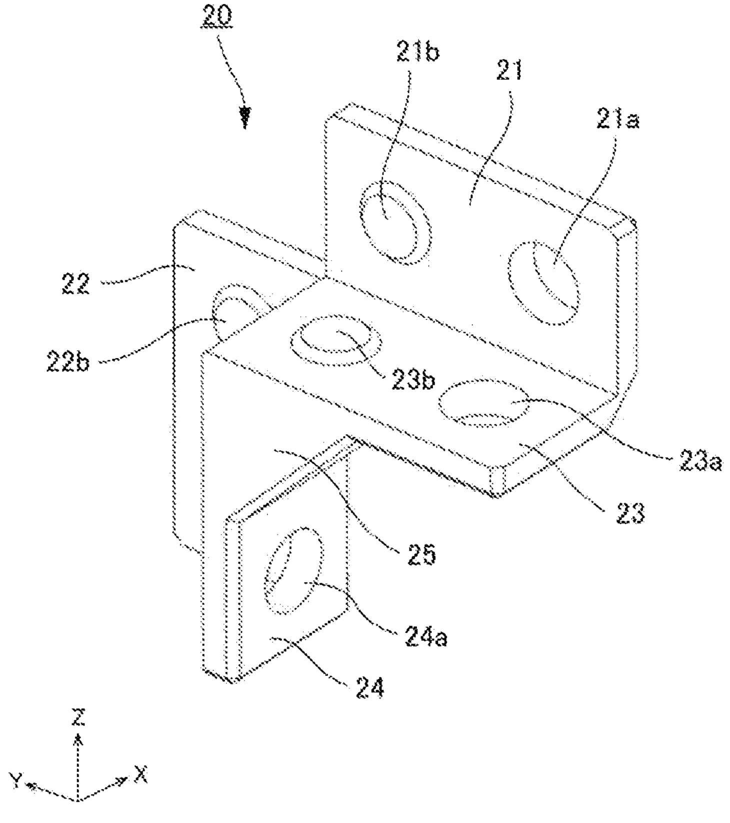
FIG. 9 is a rear perspective view of the joining member.
Figure 10:
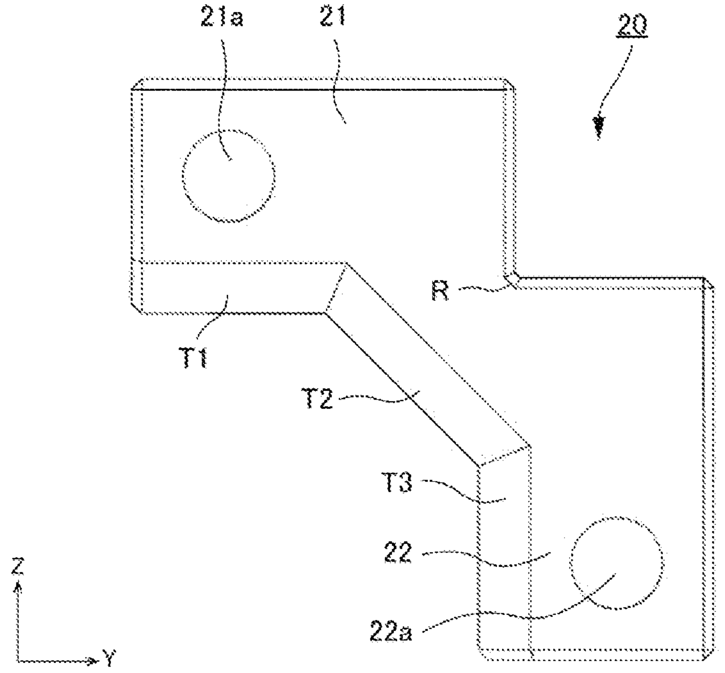
FIG. 10 is a front view of the joining member.
Figure 11:
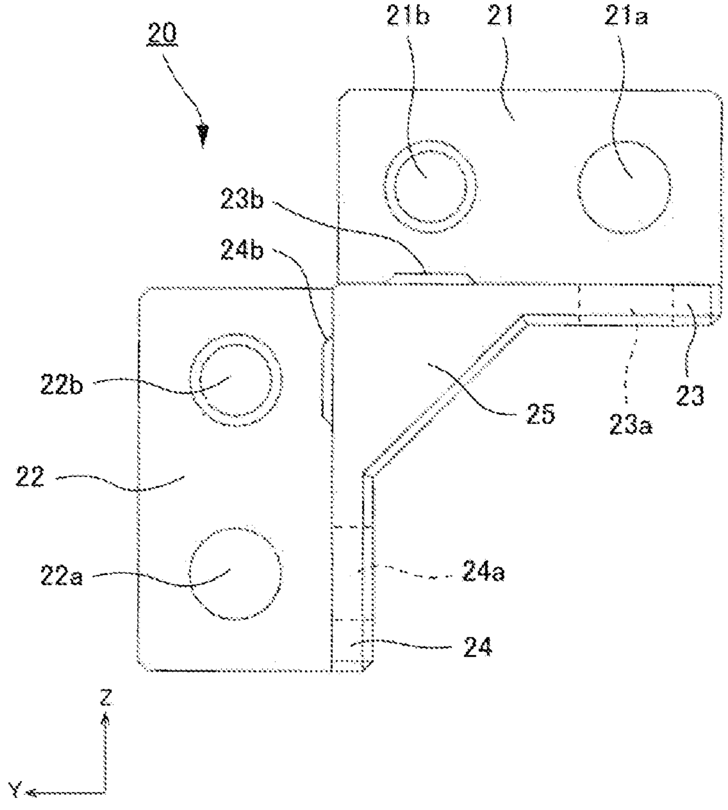
FIG. 11 is a rear view of the joining member.
Figure 12:
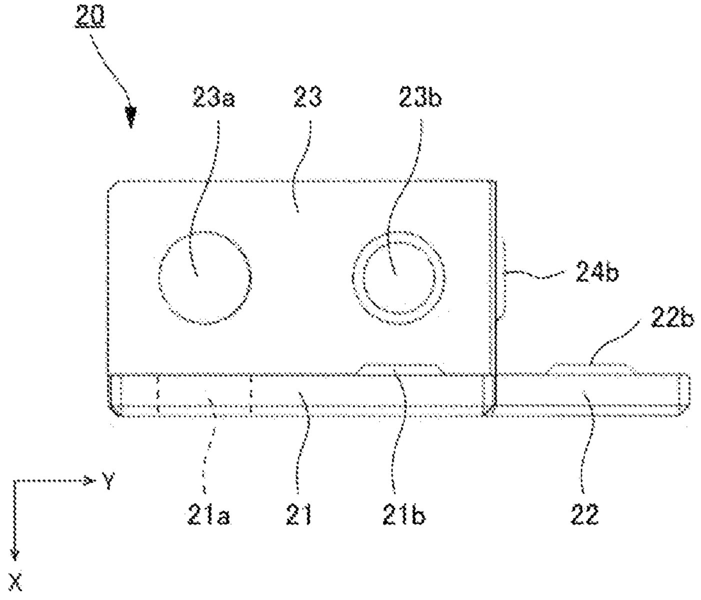
FIG. 12 is a plan view of the joining member.
Figure 13:
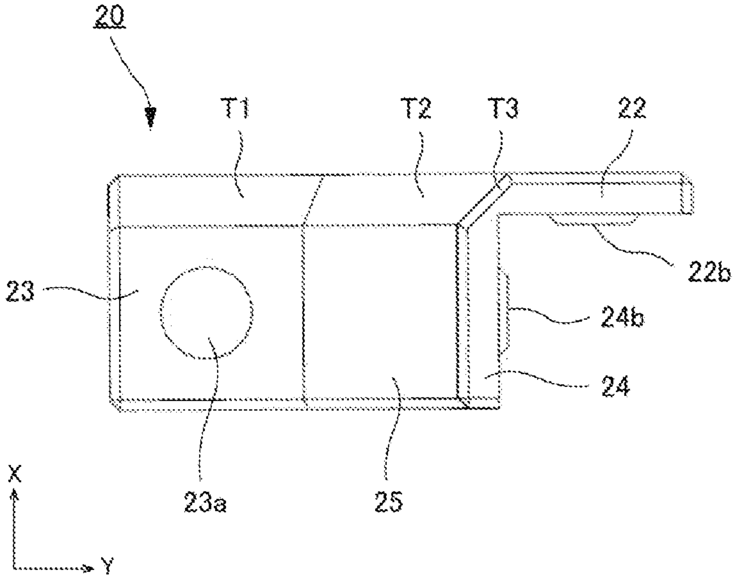
FIG. 13 is a bottom view of the joining member.
Figure 14:
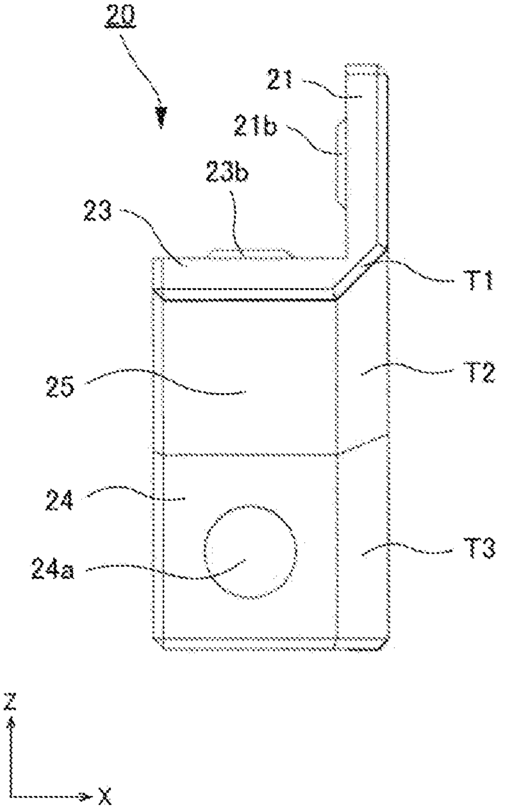
FIG. 14 is a left-side view of the joining member.
Figure 15:
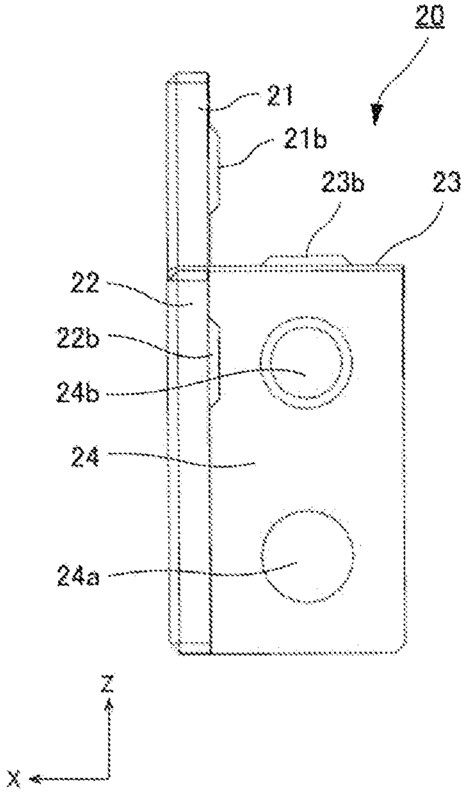
FIG. 15 is a right-side view of the joining member.

FIGS. 8 to 15 illustrate the joining member 20: FIG. 8 is a front perspective view, FIG. 9 is a rear perspective view, FIG. 10 is a front view, FIG. 11 is a rear view, FIG. 12 is a plan view, FIG. 13 is a bottom view, FIG. 14 is a left-side view, and FIG. 15 is a right-side view.

As described above, one joining member 20 connects two pole members 10, where the first support portion 23 supports the first pole member 10 in the longitudinal direction thereof at the bottom surface, and the second support portion 24, which is connected to the first support portion 23 so as to intersect it, supports the second pole member 10 in the longitudinal direction thereof at the bottom surface. Note that the bottom surface of the second support portion 24 refers to the bottom surface on the reflex angle side as viewed from the bottom surface of the first support portion 23. In addition, the bottom surface refers to the surface where the side of the pole member is in contact with the first support portion 23 or the second support portion 24 when the side of the pole member is supported by the first support portion 23 or the second support portion 24.

FIGS. 8 to 15 illustrate the first support portion 23 and the second support portion 24 intersecting at a right angle R; however, the minor angle between the first support portion 23 and the second support portion 24 may be acute or obtuse to achieve the required shape of the assemblable frame 1.

The first contact portion 21 is located on one side of the first support portion 23 along the longitudinal direction of the first pole member 10 and contacts the surface of the first pole member 10 at its side surface when viewed from the front (in the X direction). The second contact portion 22 is located on one side of the second support portion 24 along the longitudinal direction of the first pole member 10 and contacts the surface of the second pole member 10 at its side surface. The one side of the first support portion 23 where the first contact portion 21 is located and the one side of the second support portion 24 where the second contact portion 22 is located refer to side portions on the same side (both on the front side in FIGS. 8 and 10).

The reinforcement portion 25 is arranged so as to diagonally connect the inner surfaces of the first support portion 23 and the second support portion 24 on the minor angle side. Although each figure illustrates an example in which the reinforcement portion 25 is formed in the shape of a triangular pyramid covering the connection portions of the first support portion 23 and the second support portion 24, it may be formed in a different shape. For example, the reinforcement portion 25 may be in the form of a plate or a rod laid across the connection portions of the first support portion 23 and the second support portion 24.

The first support portion 23 has a through portion 23*a* at the end of its bottom surface far from the second support portion 24. Similarly, the second support portion 24 has a through portion 24*a* at the end of its bottom surface far from the first support portion 23. The through portions 23*a* and 24*a* are used for fastening by the bolts/nuts 30 in correspondence with the pole through portions 11*a* and 11*b* formed in the pole members 10.

The first contact portion 21 has the through portion 21*a* at the end of its side surface far from the second contact portion 22. Similarly, the second contact portion 22 has a through portion 22*a* at the end of its side surface far from the first contact portion 21. The through portions 21*a* and 22*a* are also used for fastening by the bolts/nuts 30 in correspondence with the pole through portions 11*a* and 11*b* formed in the pole members 10.

An example has been described above in which all of the bottom surface of the first support portion 23, the side surface of the first contact portion 21, the bottom surface of the second support portion 24, and the side surface of the second contact portion 22 have the through portions 23*a*, 21*a*, 24*a*, and 22*a*, respectively. However, in consideration of the application of the assemblable frame 1 and the material and strength of the joining member 20, at least either the first support portion 23 or the first contact portion 21 may have the through portion 23*a* or 21*a* in the bottom surface or the side surface thereof, and at least either the second support portion 24 or the second contact portion 22 may have the through portion 24*a* or 22*a* in the bottom surface or the side surface thereof. In other words, there may be a combination of the through portion 23*a* in the bottom surface of the first support portion 23 and the through portion 24*a* in the bottom surface of the second support portion 24, a combination of the through portion 23*a* in the bottom surface of the first support portion 23 and the through portion 22*a* in the side surface of the second contact portion 22, a combination of the through portion 21*a* in the side surface of the first contact portion 21 and the through portion 24*a* in the bottom surface of the second support portion 24, or a combination of the through portion 21*a* in the side surface of the first contact portion 21 and the through portion 22*a* in the side surface of the second contact portion 22. The same applies to the joining member of the second embodiment, the joining member 50 of the third embodiment, and the joining member 60 of the fourth embodiment (described later).

In FIG. 8 and the like, although the through portions 23*a*, 21*a*, 24*a*, and 22*a* are illustrated as circular holes with closed perimeters passing through the bottom surface of the first support portion 23, the side surface of the first contact portion 21, the bottom surface of the second support portion 24, and the side surface of the second contact portion 22, respectively, their shapes are not limited thereto. For example, the through portions 23*a*, 21*a*, 24*a*, and 22*a* may be slits passing through the surfaces where they are provided. The through portions 23*a*, 21*a*, 24*a*, and 22*a* are used for fastening by the bolts/nuts 30 in correspondence with the pole through portions 11*a* and 11*b* formed in the pole members 10. The slits can provide the same effect as the circular holes through fastening by the bolts/nuts 30, and also allow flexibility in alignment with the pole members 10. The shape of the slits is not particularly limited, and the slits may be, for example, U-shaped with an open end far from the center or oval-shaped with a closed perimeter.

In addition, the first support portion 23 has a convex portion 23*b* protruding toward the inside of the joining member 20 (the pole member 10 side) on its bottom surface on the side closer to the second support portion 24. Similarly, the second support portion 24 has a convex portion 24*b* protruding toward the pole member 10 side on its bottom surface on the side closer to the first support portion 23. The convex portions 23*b* and 24*b* are configured to be fitted in the pole through portions 11*a* and 11*b* formed in the pole members 10. Thus, the first support portion 23 and the second support portion 24 are fastened to the pole members 10 respectively by the convex portions 23*b* and 24*b* as well as the through portions 23*a* and 24*a*. As a result, the same effect as two-point fastening is achieved in the connection of the pole member 10 and the joining member 20, and rattling can be prevented.

The first contact portion 21 has a convex portion 21*b* protruding toward the pole member 10 side on its side surface on the side closer to the second contact portion 22. Similarly, the second contact portion 22 has a convex portion 22*b* protruding toward the pole member 10 side on its side surface on the side closer to the first contact portion 21. Thus, the first contact portion 21 and the second contact portion 22 are fastened to the pole members 10 respectively by the convex portions 21*b* and 22*b* as well as the through portions 21*a* and 22*a*. As a result, the same effect as two-point fastening is achieved in the connection of the pole member 10 and the joining member 20, and rattling can be prevented. Consequently, in the connection of the pole member and the joining member 20, they are fastened at four points by two-point fastening in the first support portion 23 and two-point fastening in the first contact portion 21 (or two-point fastening in the second support portion 24 and two-point fastening in the second contact portion 22).

While an example has been described above in which the through portions 21*a*, 22*a*, 23*a*, and 24*a* are located on the end side far from the intersection of the first support portion 23 and the second support portion 24, and the convex portions 21*b*, 22*b*, 23*b*, and 24*b* are located on the side closer to the intersection of the first support portion 23 and the second support portion 24 (see, in particular, FIG. 11), the positions of the through portions 21*a*, 22*a*, 23*a*, and 24*a* and the convex portions 21*b*, 22*b*, 23*b*, and 24*b* are not limited thereto. For example, when the joining member 20 is large in size relative to the pole members 10, the positions of the through portions 21*a*, 22*a*, 23*a*, and 24*a* and the positions of the convex portions 21*b*, 22*b*, 23*b*, and 24*b* may be reversed.

While an example has been described above in which the first contact portion 21, the second contact portion 22, the first support portion 23, and the second support portion 24 each have one through portion (21*a*, 22*a*, 23*a*, 24*a*) and one convex portion (21*b*, 22*b*, 23*b*, 24*b*), the number of the through portions and the convex portions is not limited thereto. For example, when the joining member 20 is large in size relative to the pole members 10, at least one of the first contact portion 21, the second contact portion 22, the first support portion 23, and the second support portion 24 may be extended to form a plurality of through portions (e.g., a plurality of through portions 21*a*, 21*a* in the first contact portion 21) and a plurality of convex portions (e.g., a plurality of convex portions 21*b*, 21*b* in the first contact portion 21).

In this manner, the joining member 20 can be formed such that the first support portion 23 and the second support portion 24 have at least one through portion (23*a*, 24*a*) and one convex portion (23*b*, 24*b*) in their respective bottom surfaces, and the first contact portion 21 and the second contact portion 22 have at least one through portion (21*a*, 22*a*) and one convex portion (21*b*, 22*b*) in their respective side surfaces, according to its size, strength required for the assemblable frame 1, and the like. The same applies to the joining member 40 of the second embodiment, the joining member 50 of the third embodiment, and the joining member 60 of the fourth embodiment (described later).

As illustrated in FIGS. 10, 13, and 14, the joining member 20 is provided with an edge portion T1, an edge portion T2, and an edge portion T3 formed from the first contact portion 21 to the second contact portion 22 on the minor angle side connecting the first support portion 23 and the second support portion 24. The edge portion T1 tapers toward the tip at a position corresponding to the first contact portion 21. The edge portion T3 tapers toward the tip at a position corresponding to the second contact portion 22. The edge portion T2 tapers toward the tip at a position corresponding to the continuous portion between the first contact portion 21 and the second contact portion 22.

The material of the joining member 20 is not particularly limited and may be wood, metal, or resin. Under the conditions of use for recreational games such as a mini-football game or for indoor use, resin-made ones can be preferably used because of their light weight, ease of manufacture, ease of assembly, and the like. When the joining member 20 is made of resin, the reinforcement portion 25 may be made of metal and inserted depending on its shape (e.g., bar shape, etc.). Although the joining member 20 is illustrated in the figures as having a shape corresponding to the square cross-section of the pole members 10, the shape is not limited thereto. The first contact portion 21 and the first support portion 23 as well as the second contact portion 22 and the second support portion 24 may have, for example, a rounded or truncated square cross-section or a circular cross-section (including an arcuate cross-section), according to the cross-section of the pole members 10.

Joining Member of Second Embodiment

Figure 16:
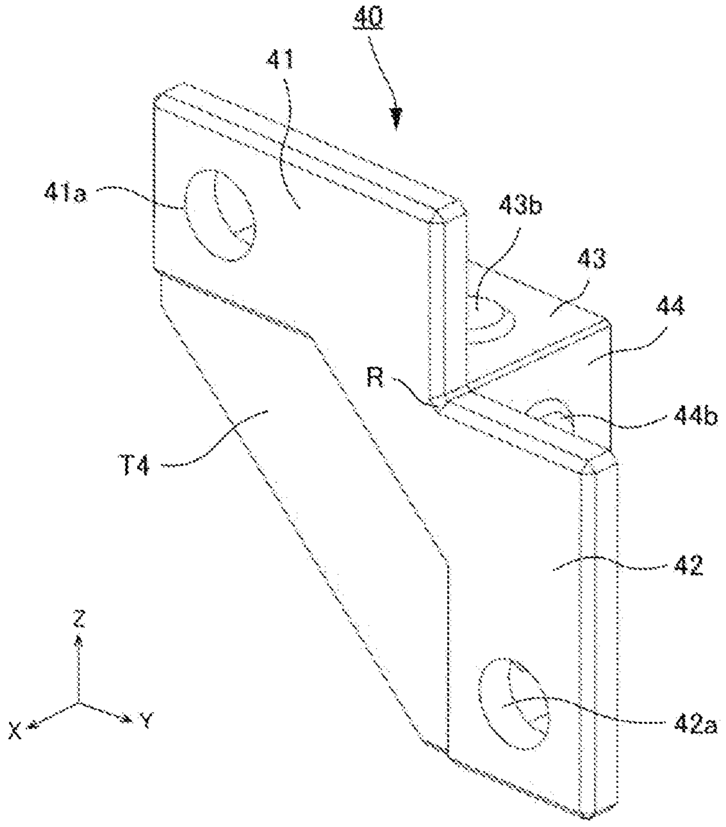
FIG. 16 is a front perspective view of a joining member according to a second embodiment.
Figure 17:
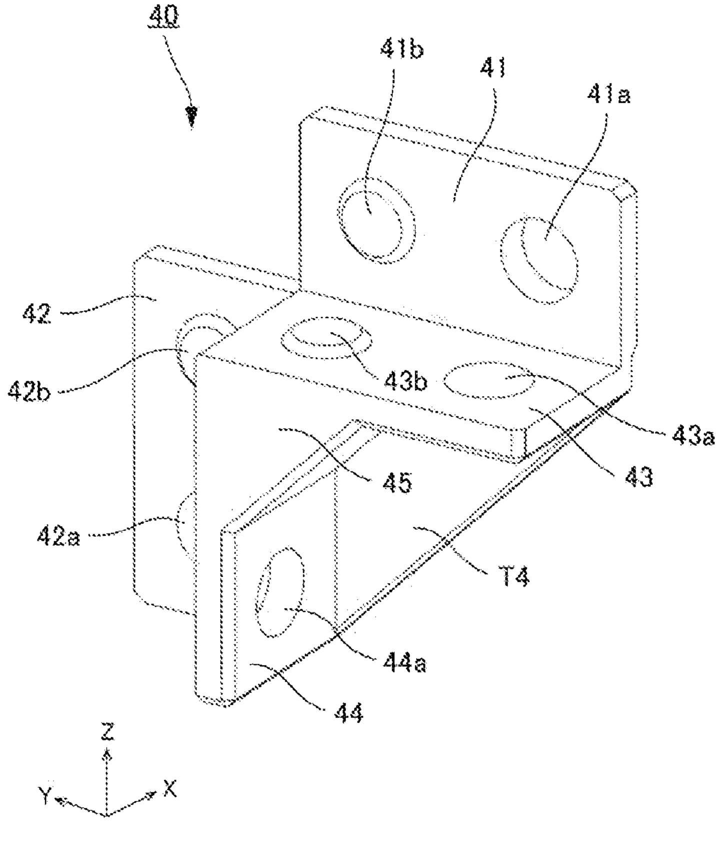
FIG. 17 is a rear perspective view of the joining member.

Next, the joining member 40 according to the second embodiment will be described with reference to FIGS. 16 and 17. As illustrated in FIGS. 16 and 17, the joining member 40 includes a first contact portion 41, a second contact portion 42, a first support portion 43, a second support portion 44, and a reinforcement portion 45.

FIGS. 16 and 17 illustrate the joining member 40: FIG. 16 is a front perspective view, and FIG. 17 is a rear perspective view.

The joining member 40 has a structure basically similar to that of the joining member 20, except that the joining member 40 is provided with a plate-like portion T4 in place of the edge portions T1, T2, and T3 formed in the joining member 20. As illustrated in FIGS. 16 and 17, the plate-like portion T4 is formed in a recessed (thinner) shape from the first contact portion 41 to the second contact portion 42 on the minor angle side connecting the first support portion 43 and the second support portion 44. The joining member 40 is otherwise similar to the joining member 20 of the first embodiment. Therefore, only the reference characters of the corresponding elements are replaced (e.g., the through portion 21*a* and the convex portion 21*b* formed in the first contact portion 21 of the first embodiment are replaced with a through portion 41*a* and a convex portion 41*b* formed in the first contact portion 41 of the second embodiment), and the description thereof is omitted.

(Assembly Procedure)

The procedures for assembling the assemblable frame 1 using the joining members 20 of the first embodiment will be described below with reference to FIGS. 18 to 23. The assemblable frame 1 can be assembled in the same manner using the joining members 40 of the second embodiment, the joining members 50 of the third embodiment (described later), and the joining members 60 of the fourth embodiment (described later). Incidentally, although the way in which the joining members 20 are connected (the position of attachment to the pole members 10; the same applies hereinafter) illustrated in FIGS. 18 to 23 is different from that illustrated in FIGS. 1 to 7, they may be connected in either way, and there is no difference in the effects of the joining members (20, 40, 50, 60). Since the connection method can be selected in this manner, the connection using the joining members (20, 40, 50, 60) can be flexibly varied according to the conditions of use of the assemblable frame 1, thus providing flexibility.

Figure 18:
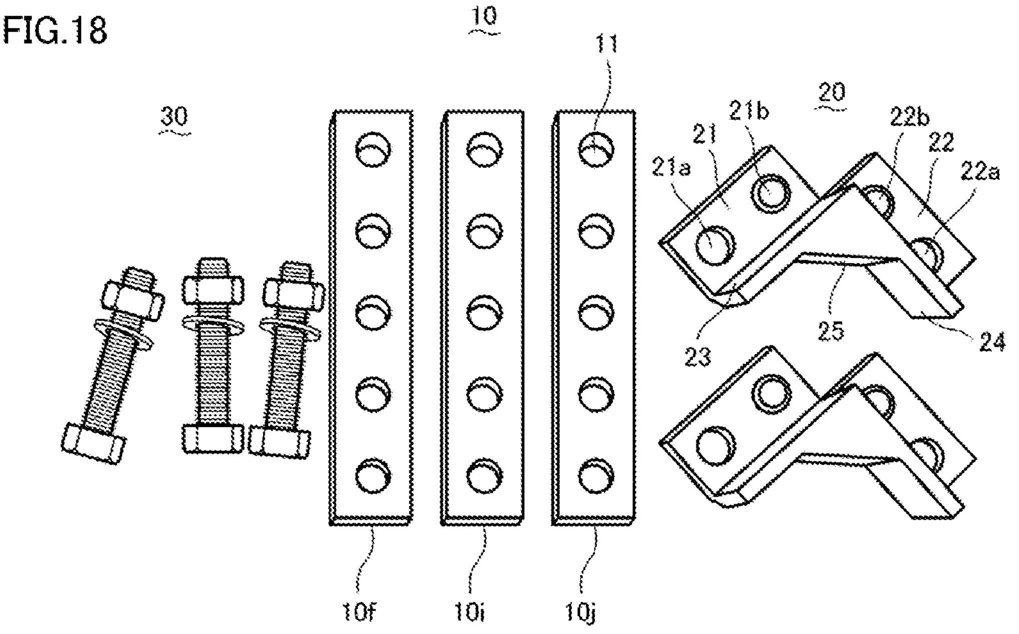
FIG. 18 is a diagram for explaining the procedure (1) of the assembly of the joining member and pole members according to the first embodiment.

First, as illustrated in FIG. 18, three pole members (the pole members 10 are cut short in the figures for illustrative purposes), two joining members 20, and three bolts/nuts 30 are prepared as components of the assemblable frame 1.

Figure 19:
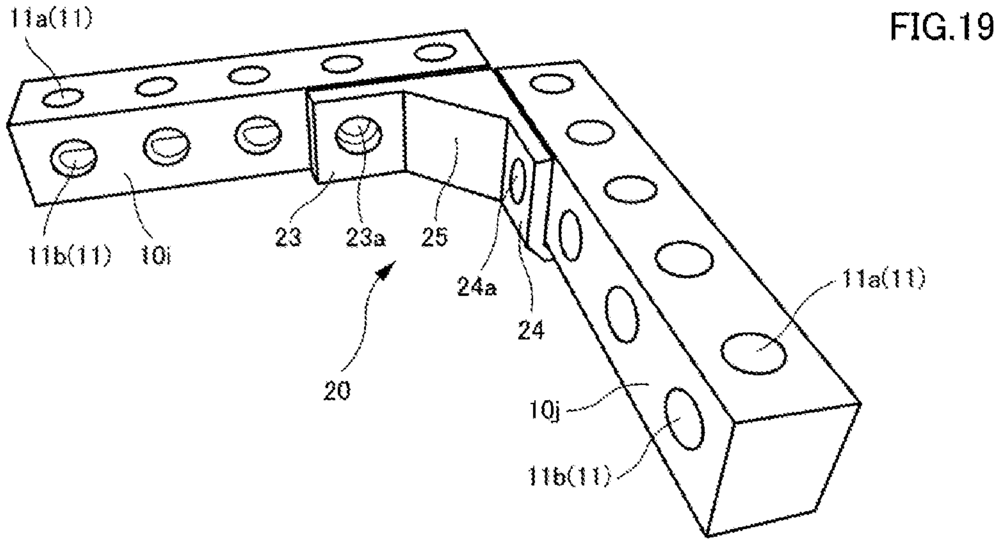
FIG. 19 is a diagram for explaining the procedure (2)

Next, as illustrated in FIG. 19, two pole members 10, i.e., the first pole member 10*i* and the second pole member 10*j*, are arranged in an L-shape in the horizontal direction, and the first joining member 20 is aligned with their ends. In this step, the first joining member 20 is aligned in such a manner that the first pole member 10*i* is supported by the first support portion 23 so that the end thereof does not exceed the connection portion between the first support portion 23 and the second support portion 24, and that the second pole member 10*j* is supported by the second support portion 24 so that the end thereof does not exceed the connection portion between the second support portion 24 and the first support portion 23. At this time, the through portion 23*a* of the first support portion 23 and the through portion 24*a* of the second support portion 24 of the first joining member 20 are positioned to correspond to the pole through portion 11*b* of the first pole member 10*i* and the pole through portion 11*b* of the second pole member 10*j*, respectively.

Figure 20:
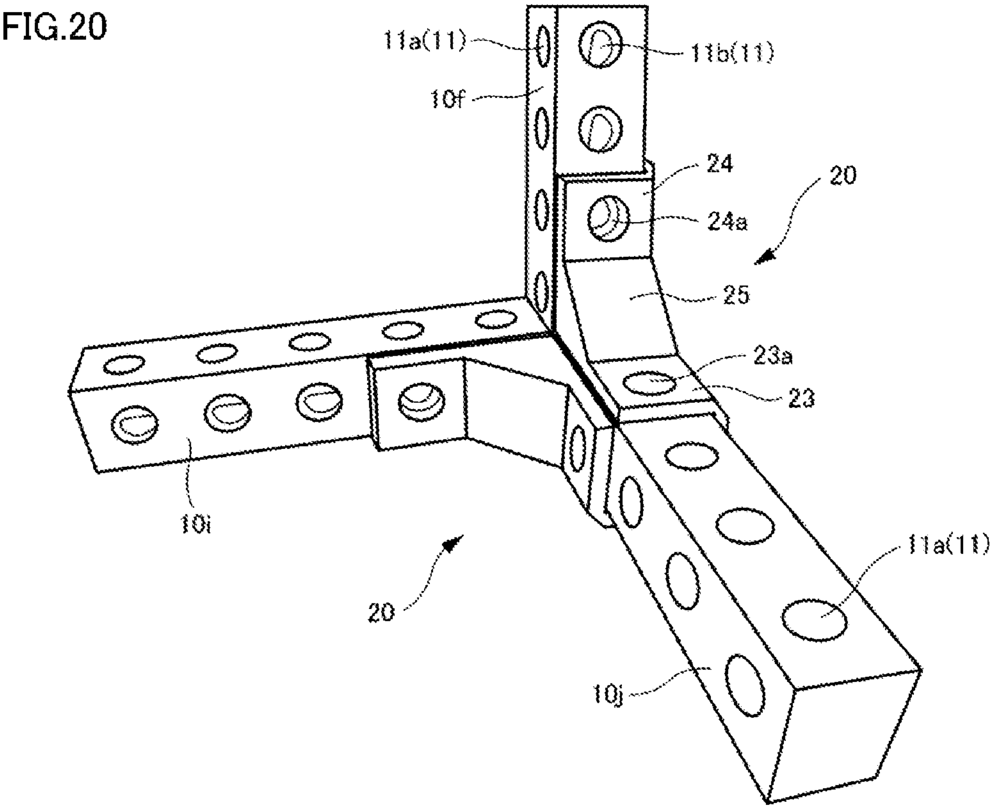
FIG. 20 is a diagram for explaining the procedure (3)

After that, as illustrated in FIG. 20, the third pole member 10*f* is vertically placed in the space between the ends of the first pole member 10*i* and the second pole member 10*j*. In this step, the second joining member 20 is aligned in such a manner that the second pole member 10*j* is supported by the first support portion 23 so that the end thereof does not exceed the connection portion between the first support portion 23 and the second support portion 24, and that the third pole member 10*f* is supported by the second support portion 24 so that the end thereof exceeds the connection portion between the second support portion 24 and the first support portion 23. At this time, the through portion 23*a* of the first support portion 23 and the through portion 24*a* of the second support portion 24 of the second joining member are positioned to correspond to the pole through portion 11*a* of the second pole member 10*j* and the pole through portion 11*b* of the third pole member 10*f*, respectively. Although not illustrated in FIG. 20, at this time, the through portion 22*a* of the second contact portion 22 of the second joining member 20 is positioned to correspond to the pole through portion 11*a* of the third pole member 10*f* (see FIGS. 21 and 22).

Figure 21:
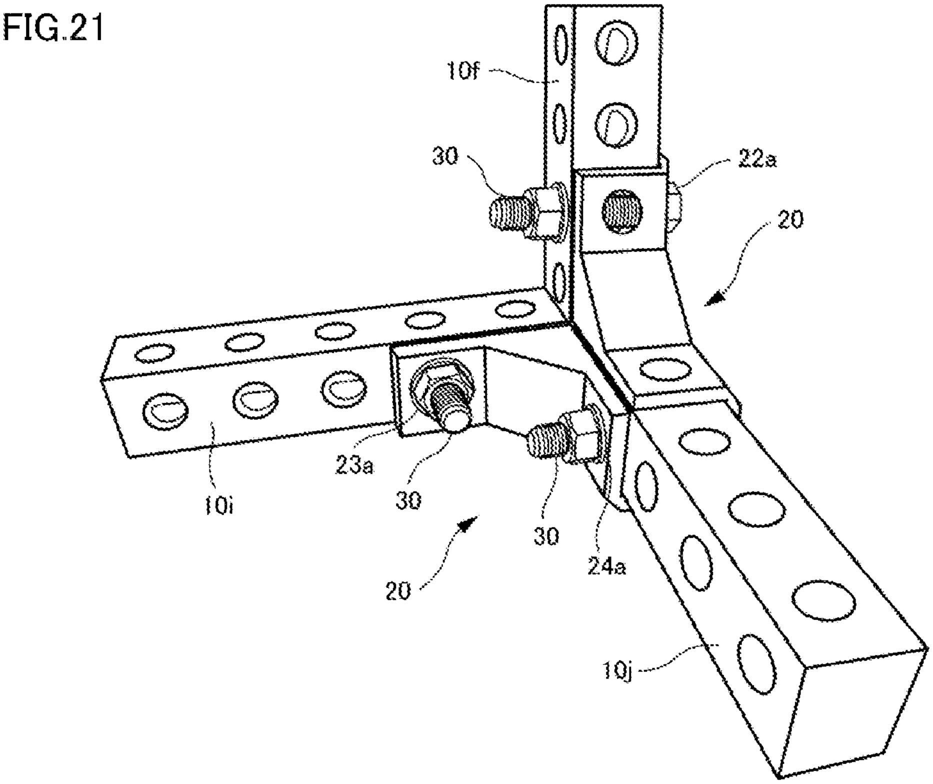
FIG. 21 is a diagram for explaining the procedure (4)

Thereafter, as illustrated in FIG. 21, the first joining member 20 is fastened to the first pole member 10*i* and the second pole member 10*j* with the bolts/nuts 30 through the through portions 23*a* and 24*a* of the first joining member 20. Similarly, the second joining member 20 is fastened to the third pole member 10*f* with the bolt/nut 30 through the through portion 22*a* of the second joining member 20.

Figure 22:
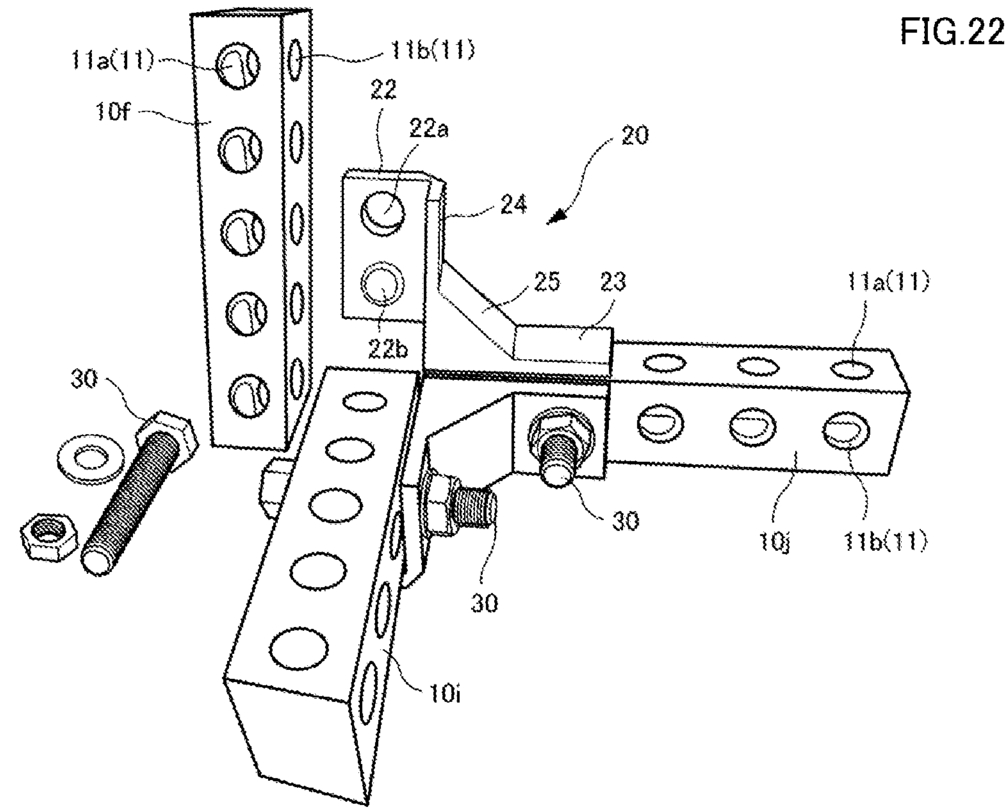
FIG. 22 is a diagram for explaining the procedure (5)
Figure 23:
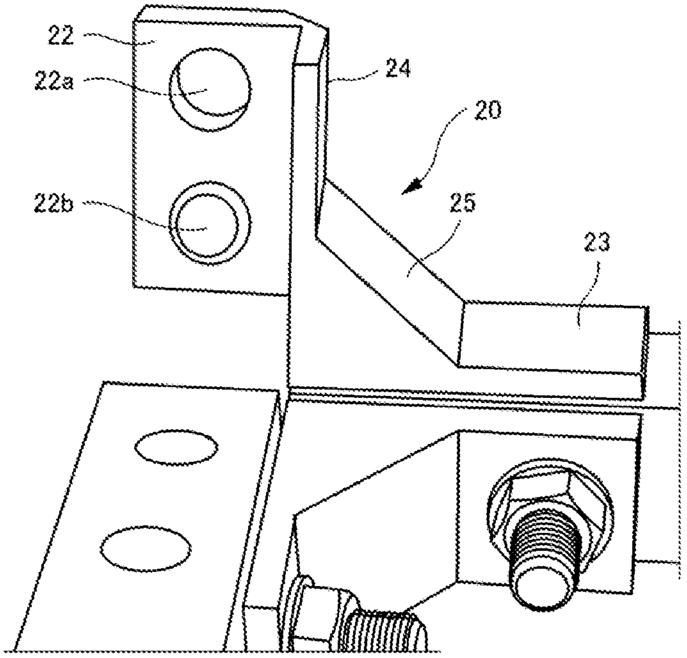
FIG. 23 is a diagram for explaining the procedure (6)

FIG. 22 illustrates the state immediately before the assembly of the third pole member 10*f*. FIG. 23 illustrates an enlarged view of the second joining member 20 in FIG. 22. As illustrated in FIGS. 22 and 23, the second contact portion 22 of the joining member 20 is provided with the through portion 22*a* and the convex portion 22*b* as described above. As illustrated in FIG. 21, the through portion 22*a* and the pole through portion 11*a* of the third pole member 10*f* are fastened by the bolt/nut 30. At this time, the convex portion 22*b* is fitted in the pole through portion 11*a*, which is different from and located below the pole through portion 11*a* fastened by the bolt/nut 30. As a result, the same effect as two-point fastening is achieved in the connection of the pole member 10 and the joining member 20, and rattling can be prevented.

Joining Member of Third Embodiment

Figure 24:
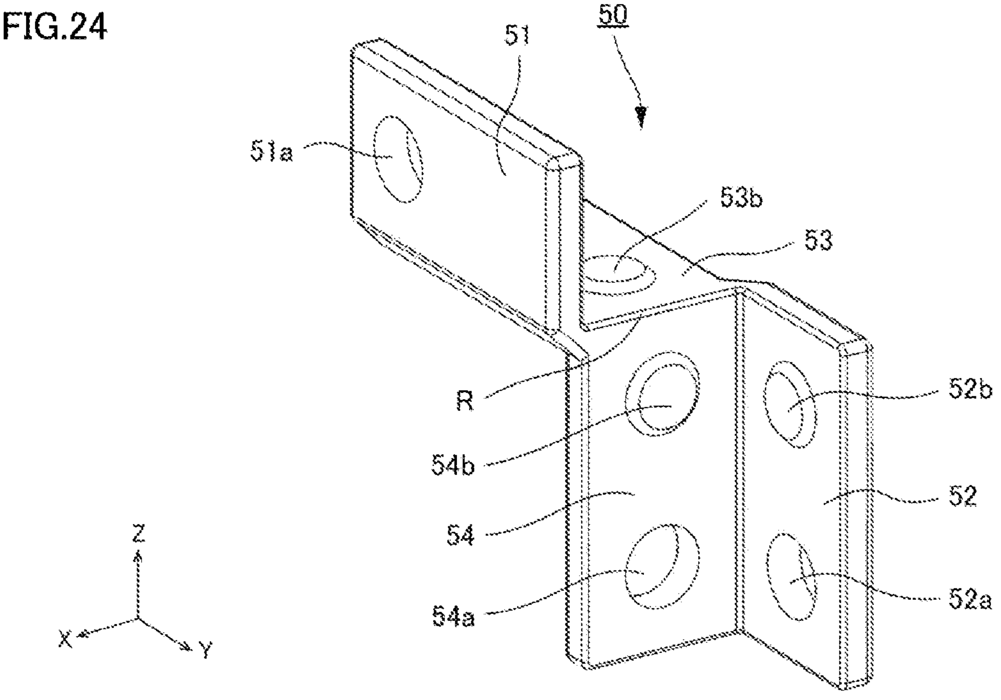
FIG. 24 is a front perspective view of a joining member according to a third embodiment.
Figure 25:
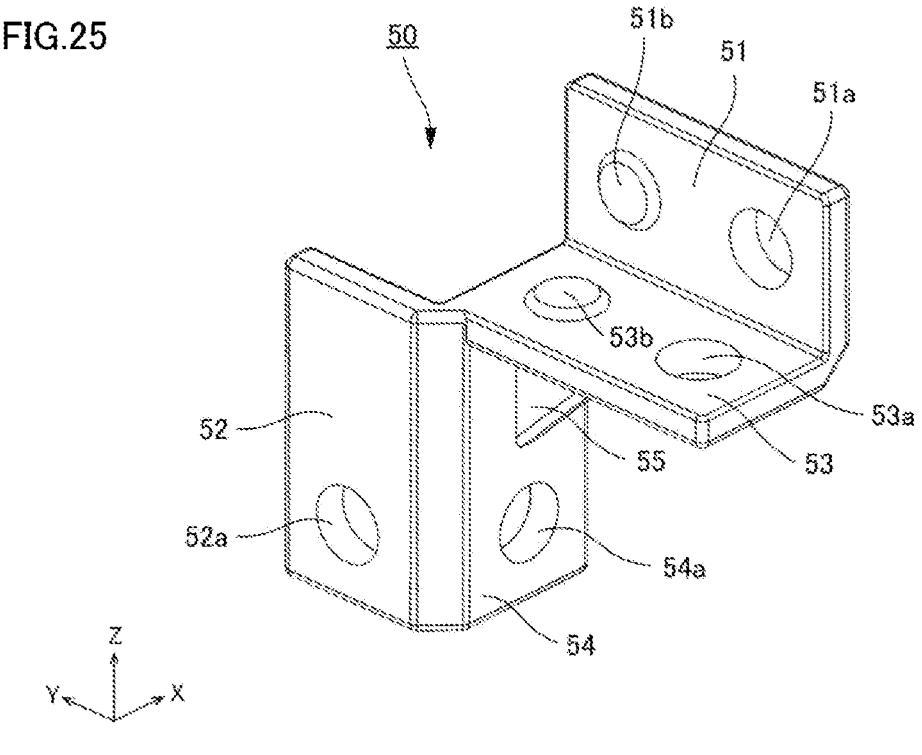
FIG. 25 is a rear perspective view of the joining member.

The joining member 50 according to the third embodiment will be described with reference to FIGS. 24 to 27. As illustrated in FIGS. 24 and 25, the joining member 50 includes a first contact portion 51, a second contact portion 52, a first support portion 53, a second support portion 54, and a reinforcement portion 55.

FIGS. 24 and 25 are front and rear perspective views of the joining member 50, respectively. FIGS. 26 and 27 are front and rear perspective views for explaining the assembly of the joining member 50 and the pole members 10, respectively.

As illustrated in FIGS. 24 and 25, the joining member 50 is different from the joining member 20 of the first embodiment and the joining member 40 of the second embodiment in that the first contact portion 51 is located on one side of the first support portion 53 along the longitudinal direction of the first pole member 10 and contacts the surface of the first pole member 10 at its side surface when viewed from the front (in the X direction). The second contact portion 52 is located on the other side of the second support portion 54 along the longitudinal direction of the first pole member 10 and contacts the surface of the second pole member 10 at its side surface. The one side of the first support portion 53 where the first contact portion 51 is located and the other side of the second support portion 54 where the second contact portion 52 is located are opposite side portions across the first support portion 53 and the second support portion 54 (in FIGS. 24 and 25, the first contact portion 51 is on the front side, and the second contact portion 52 is on the rear side).

The joining member 50 is otherwise similar to the joining member 20 of the first embodiment. Therefore, only the reference characters of the corresponding elements are replaced (e.g., the through portion 21*a* and the convex portion 21*b* formed in the first contact portion 21 of the first embodiment are replaced with a through portion 51*a* and a convex portion 51*b* formed in the first contact portion 51 of the third embodiment), and the description thereof is omitted.

The pole members 10 are assembled with the joining members 50 by the same procedure as with the joining members of the first embodiment and the joining members 40 of the second embodiment. FIGS. 26 and 27 illustrate an example in which two pole members 10*i* and 10*j* are assembled.

Joining Member of Fourth Embodiment

Figure 28:
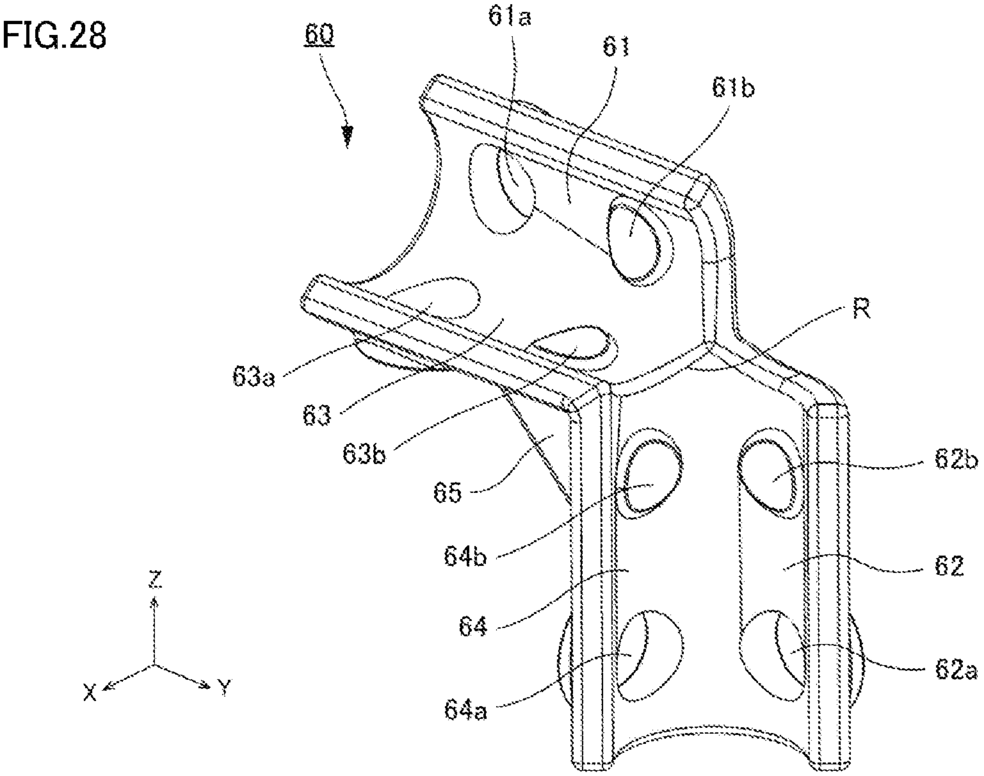
FIG. 28 is a front perspective view of a joining member according to a fourth embodiment.
Figure 29:
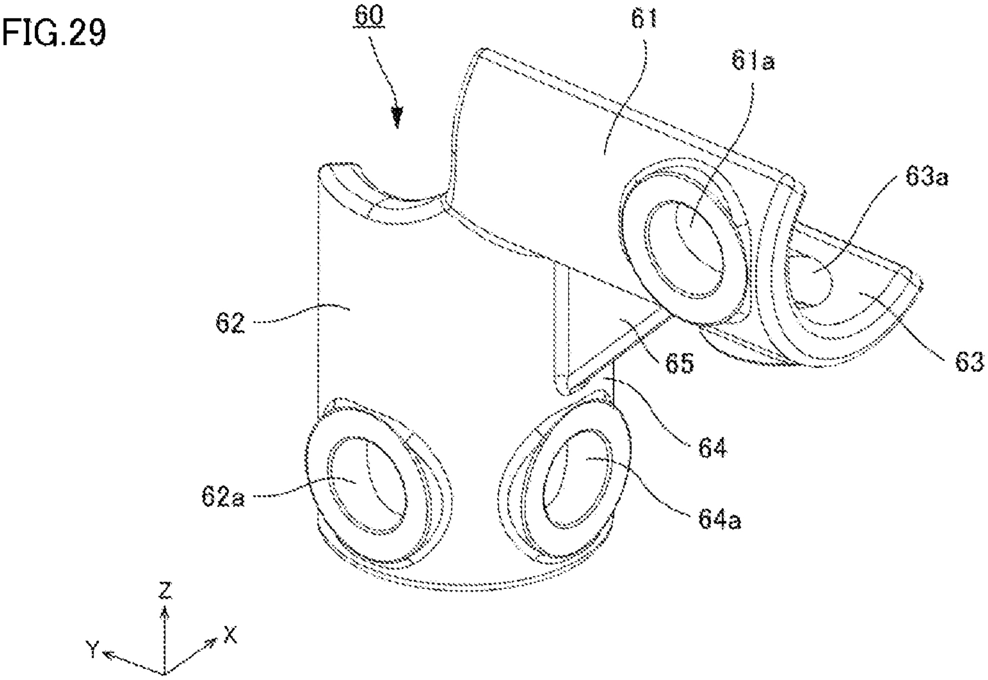
FIG. 29 is a rear perspective view of the joining member.

The joining member 60 according to the fourth embodiment will be described with reference to FIGS. 28 to 31. As illustrated in FIGS. 28 and 29, the joining member 60 includes a first contact portion 61, a second contact portion 62, a first support portion 63, a second support portion 64, and a reinforcement portion 65.

Figure 30:
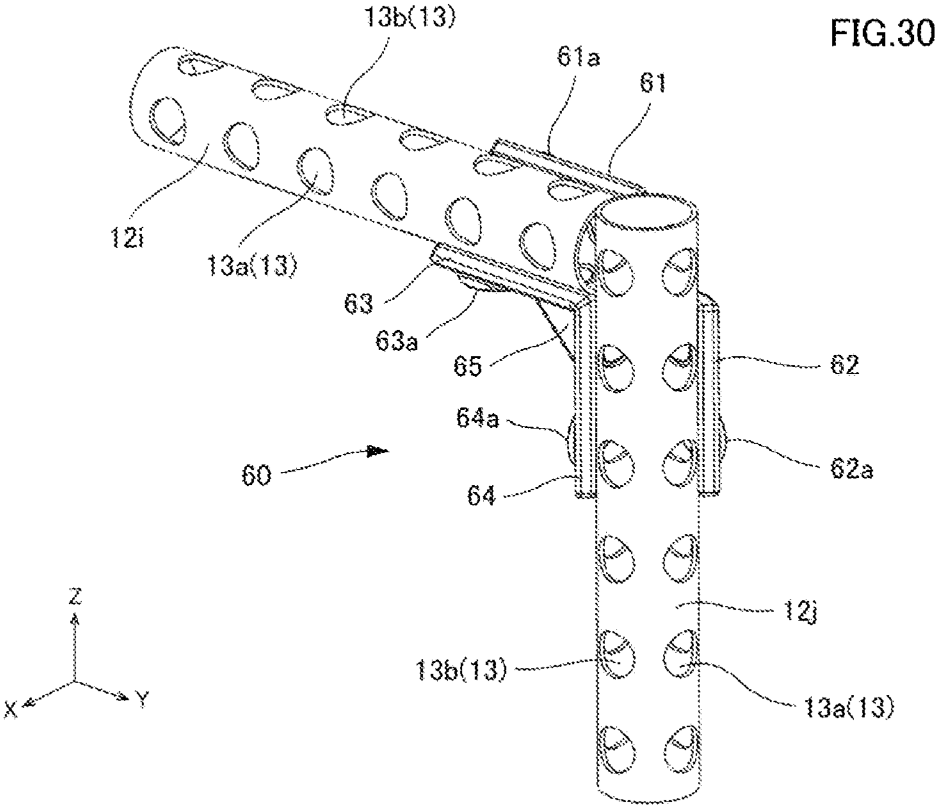
FIG. 30 is a front perspective view for explaining the assembly of the joining member and pole members according to the fourth embodiment.
Figure 31:
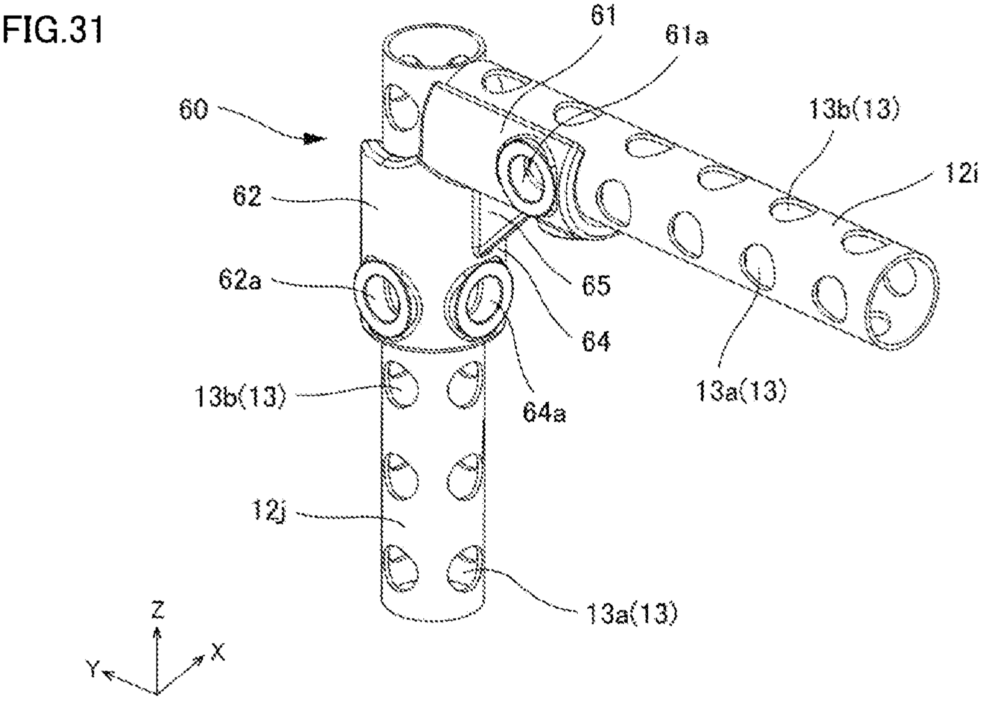
FIG. 31 is a rear perspective view for explaining the assembly of the joining member and the pole members.

FIGS. 28 and 29 are front and rear perspective views of the joining member 60, respectively. FIGS. 30 and 31 are front and rear perspective views for explaining the assembly of the joining member 60 and pole members 12, respectively. As illustrated in FIGS. 28 and 29, the joining member 60 is different from the joining member 20 of the first embodiment, the joining member 40 of the second embodiment, and the joining member 50 of the third embodiment in that the first support portion 63 and the second support portion 64 as well as the first contact portion 61 and the second contact portion 62 are formed in a curved plate shape assuming that pole members 12*i* and 12*j* have a circular cross-section (see FIGS. 30 and 31). In FIGS. 28 and 29, as with the joining member 20 of the first embodiment and the joining member 40 of the second embodiment, one side of the first support portion 63 where the first contact portion 61 is located and one side of the second support portion 64 where the second contact portion 62 is located are side portions on the same side (both on the back side in FIGS. 28 and 29). However, similarly to the joining member 50 of the third embodiment, the first contact portion 61 is located on one side of the first support portion 63, whereas the second contact portion 62 may be located on the other side of the second support portion 64.

The joining member 60 is otherwise similar to the joining member 20 of the first embodiment. Therefore, only the reference characters of the corresponding elements are replaced (e.g., the through portion 21*a* and the convex portion 21*b* formed in the first contact portion 21 of the first embodiment are replaced with a through portion 61*a* and a convex portion 61*b* formed in the first contact portion 61 of the fourth embodiment), and the description thereof is omitted. Note, however, that since the first support portion 63, the second support portion 64, the first contact portion 61, and the second contact portion 62 of the joining member 60 are formed in a curved plate shape, through portions 63*a*, 64*a*, 61*a*, and 62*a* formed therein each have a flat head on the outside of the joining member 60 (on the side opposite to the pole member 12) for convenience in fastening the bolt/nut 30. Incidentally, the pole members 12*i* and 12*j* have pole through portions 13 (13*a*, 13*b*) as in the above embodiments.

The pole members 12 are assembled with the joining members 60 by the same procedure as with the joining members of the first embodiment and the joining members 40 of the second embodiment. FIGS. 30 and 31 illustrate an example in which two pole members 12*i* and 12*j* are assembled. The bolts/nuts 30 are not illustrated in FIGS. 30 and 31.

Assemblable Frame of Fifth Embodiment

An assemblable frame according to a fifth embodiment will be described with reference to FIGS. 32 to 36. In this embodiment, ropes 76 are stretched between the pole members in the assemblable frame 1 assembled using the joining members according to the above embodiments.

The pole members 10 each have the pole through portions 11 in their extending direction (longitudinal direction). The pitch of the pole through portions 11 is preferably set equal to the width of the pole member 10. In addition, the pole through portions 11 are preferably arranged at regular intervals in the longitudinal direction of the pole member 10, and more preferably are provided over the entire length of the pole member 10.

The assemblable frame 1 is configured by combining a plurality of pole members 10 having a plurality of pole through portions 11 using joining members as a structure in which the ropes 76 can be stretched.

The shape and structure of the assemblable frame 1 are not particularly limited. However, the assemblable frame 1 may often include a frame body whose outer edge is surrounded by the pole members 10, and the frame body is often rectangular.

Figure 32:
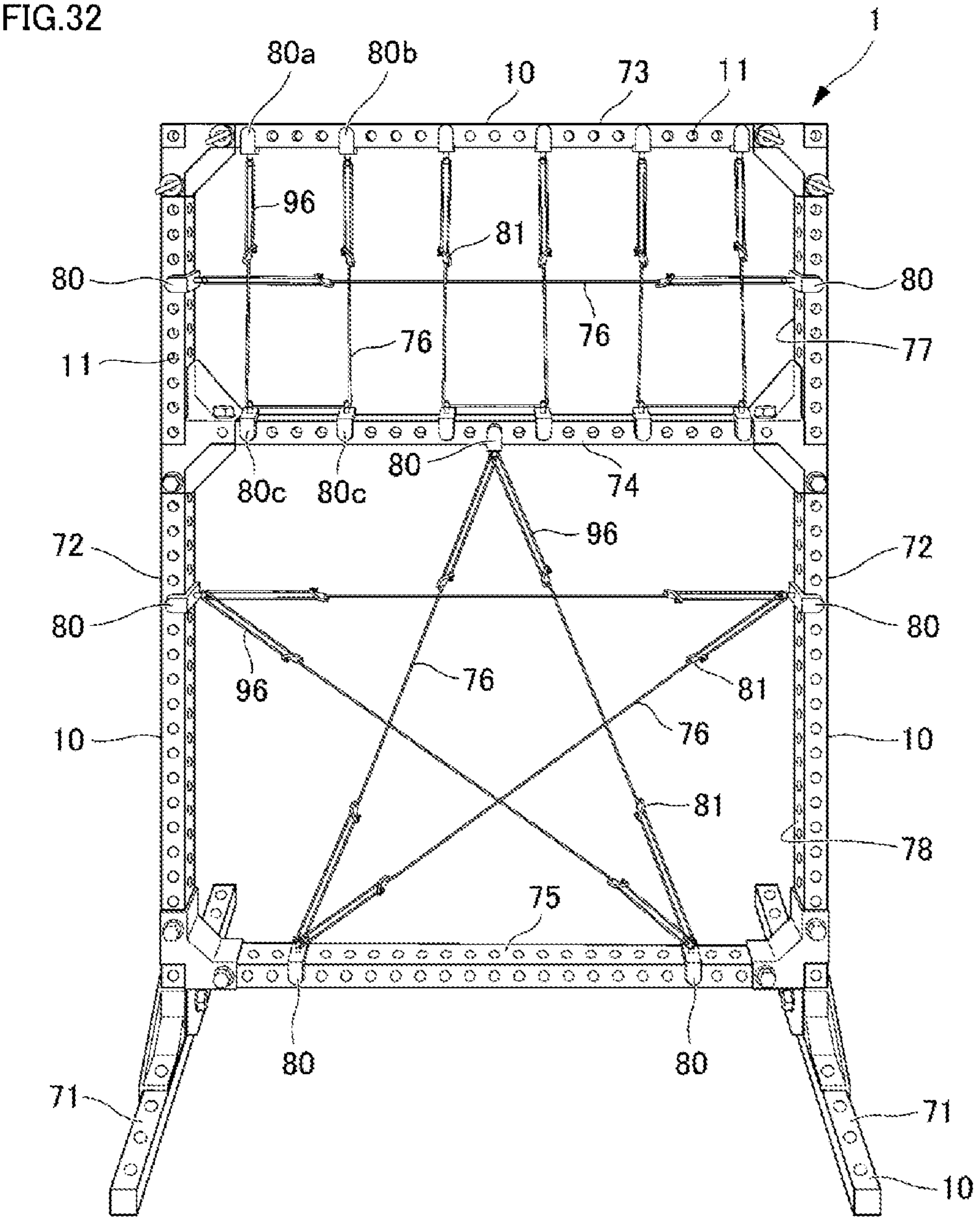
FIG. 32 is a front perspective view illustrating an assemblable frame according to a fifth embodiment.

FIG. 32 is a front view illustrating an example of an assemblable frame. This assemblable frame 1 is formed of a pair of pole members 10 serving as base frame members 71, a pair of pole members 10 erected as column frame members 72 in the center of the base frame members 71 in the front-rear direction, and an upper frame member 73, an intermediate frame member 74, and a lower frame member 75 fixed to the column frame members 72 by the joining members as described above. This assemblable frame 1 is a structure like a screen.

In the assemblable frame 1 illustrated in FIG. 32, a small rectangular first frame 77 is formed on the upper side, and a large rectangular second frame 78 is formed on the lower side. The ropes 76 are strung across these two frames 77 and 78 by using hooks 80 and length adjusters 81 to form the assemblable frame 1.

Note that this assemblable frame 1 is a structure for illustrative purposes, and the overall shape thereof varies depending on the use of the assemblable frame 1 in which the ropes 76 are stretched. That is, the configuration of the assemblable frame 1 varies depending on the use of the item in which the ropes 76 are stretched. Examples of the item include a goal set as illustrated in FIG. 1 in the first embodiment, a locking plate (not illustrated) for hanging various articles on the ropes 76, furniture (not illustrated) such as a chair, storage box, and table, and playground equipment (not illustrated).

Figure 33:
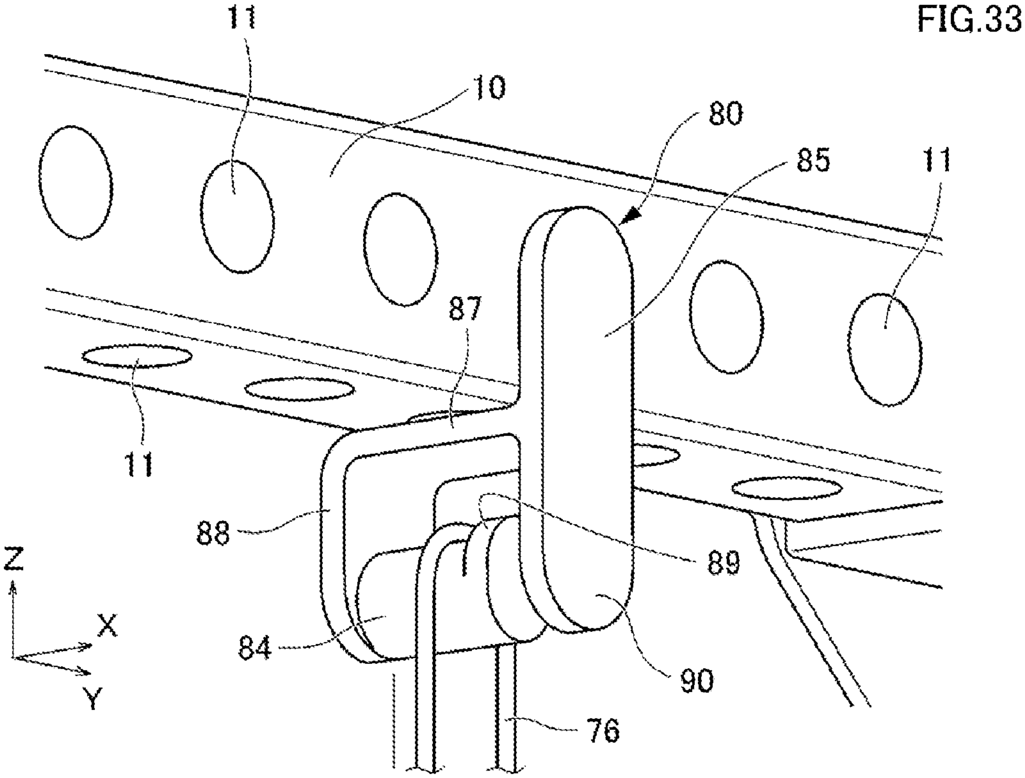
FIG. 33 is a perspective view of the assemblable frame in which an example of a hook is attached to a pole through portion.
Figure 34:
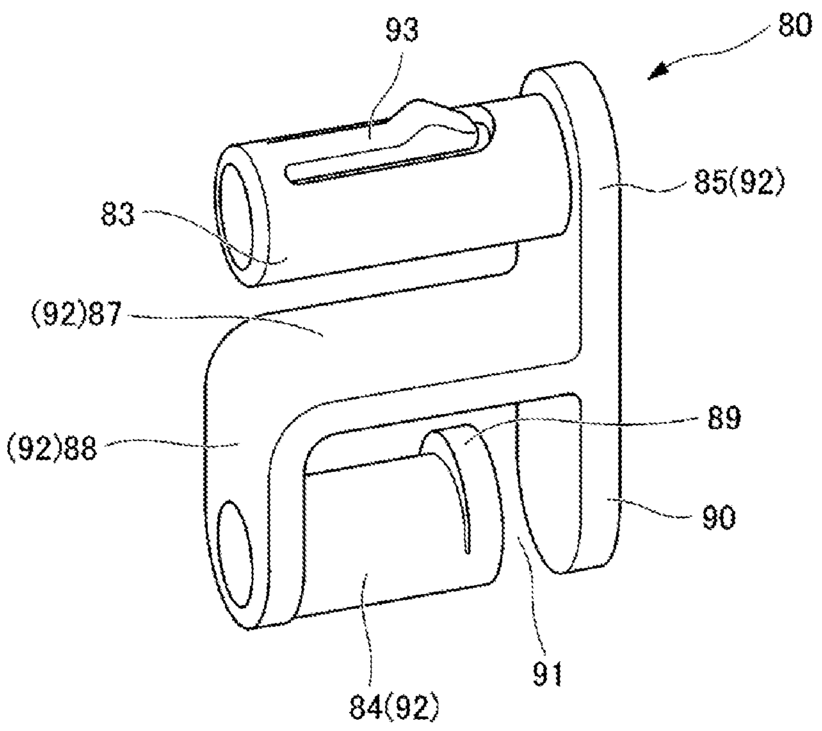
FIG. 34 is a perspective view of the hook.
Figure 35:
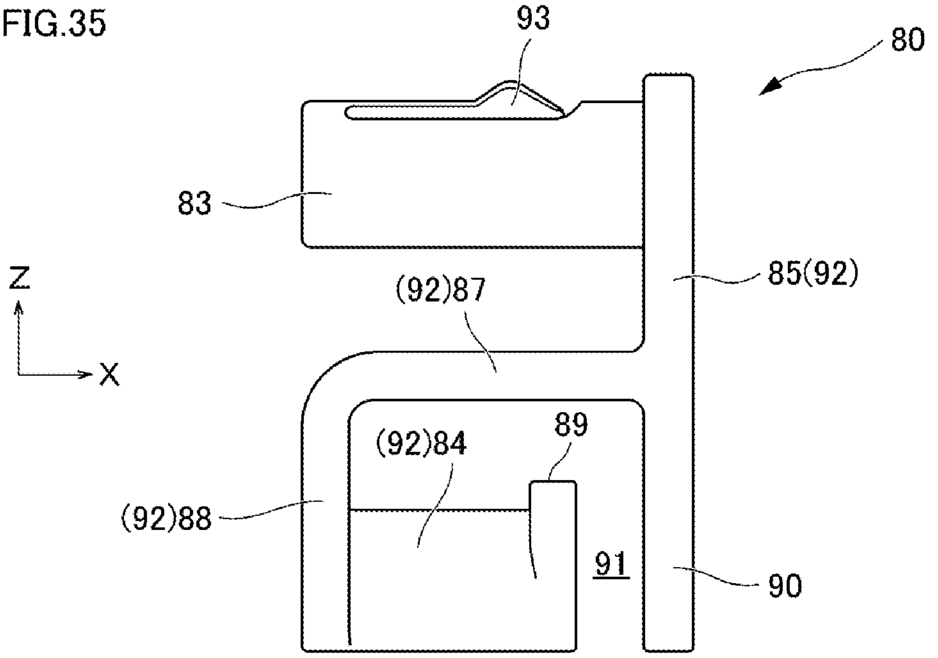
FIG. 35 is a side view of the hook.

FIG. 33 is a perspective view illustrating an example of the structure of the hook attached to the pole through portion. FIG. 34 is a perspective view of the hook. FIG. 35 is a side view of the hook.

The hook 80 includes at least an insertion portion 83 configured to be removably inserted into and engaged with the pole through portion 11 and a rope engaging portion 84 extending from the insertion portion 83. The hook 80 further includes a body portion 92 that connects the insertion portion 83 to the rope engaging portion 84.

In the example of FIGS. 33 to 35, the insertion portion 83 has a length that is at least half the length of the pole through portion 11, preferably about the same length. The vertical cross-sectional shape of the insertion portion 83 is circular, as is the shape of the pole through portion 11.

As illustrated in FIGS. 33 and 35, the hook 80 will be described with reference to the front-rear direction X, the horizontal direction Y (left-right direction), and the vertical direction Z.

The body portion 92 includes a base portion 85 extending downward from the base side of the insertion portion 83, a support portion 87 extending rearward from the base portion 85 in parallel with the insertion portion 83, and a hanging portion 88 extending downward from the end of the support portion 87. The rope engaging portion 84 is connected to the hanging portion 88. The rope engaging portion 84 has a disengagement preventing portion 89 that protrudes upward on the front side.

From the insertion portion 83, through the base portion 85, the support portion 87, and the hanging portion 88 to the rope engaging portion 84, the hook 80 is formed in a substantially S-shape or a substantially 5-shape. In the example of FIGS. 33 to 35, the base portion 85 is provided with a tongue portion 90 that extends downward and has a surface facing the tip of the rope engaging portion 84. Since the base portion 85 has the tongue portion 90, the hook 80 can be easily picked up, facilitating the insertion of the insertion portion 83 into the pole through portion 11.

A gap 91 is formed between the tip of the rope engaging portion 84 and the tongue portion 90 to allow the rope 76 to pass therethrough. The rope 76 received by the rope engaging portion 84 is prevented from slipping off by the disengagement preventing portion 89 and the tongue portion 90.

In addition, the insertion portion 83 is provided with a swing piece 93, which extends from the distal end side toward the proximal end side and swings in the top-bottom direction with the distal end side as the base. The elastic deformation of the swing piece 93 allows the insertion portion 83 to be in a state of being engaged with the pole through portion 11 and a state of being disengaged therefrom. With this configuration, the insertion portion 83 can be freely inserted into and removed from the pole through portion 11 and can be stably held in the pole through portion 11.

The rope engaging portion 84 is preferably arranged so as to be located on the inner surface side of the frame formed by the pole members 10, and more preferably, the rope engaging portion 84 is arranged so as to face the inner surface of the frame. When the rope engaging portion 84 is located on the inner surface side of the frame, the rope 76 does not protrude from the outer surface of the pole member and can be stretched within the frame.

The hook 80 has at least one insertion portion 83. In many cases, the hook 80 has one or two insertion portions 83; however, it may have three or more insertion portions 83, for example, when a large force is applied to the rope. There may also be two insertion portions 83 arranged to face each other such that the insertion portions 83 can be inserted in two facing pole through portions 11 as necessary.

Figure 36:
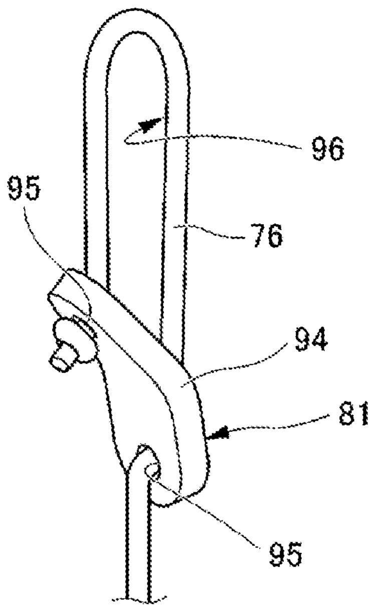
FIG. 36 is a perspective view illustrating an example of a length adjuster for the assemblable frame.

FIG. 36 is a perspective view illustrating an example of a length adjuster. As illustrated in FIG. 32, the length adjuster

81 is used to adjust the length of the rope stretched between a starting point hook 80*a* and an end point hook 80*b* with a simple operation. As illustrated in FIG. 36, the length adjuster 81 includes a substantially oval plate 94 having two rope insertion holes 95. One end side of the substantially oval plate 94 is bent at a predetermined angle. The length adjuster 81 is provided at each end of one rope 76, and the rope is doubled at the length adjuster 81 to form a loop portion 96. Two loop portions 96 at both ends of the rope 76 are engaged with the starting point hook 80*a* and the end point hook 80*b* on the frame to form a rope-stretched shape where the length of the rope 76 can be adjusted. Note that the length adjuster 81 need not necessarily be configured as illustrated in FIG. 36, and various length adjusters may be used as long as they are capable of appropriately adjusting the length of the rope 76 through a simple operation.

The assembly and advantages of the assemblable frame 1 will be described below.

(1) The pole members 10, each having the pole through portions 11, are assembled using joining members to form the assemblable frame 1 of a predetermined shape.

(2) The hooks 80 are attached to the pole through portions 11 at predetermined locations to achieve a rope-stretched shape suitable for the purpose of use.

(3) One loop portion 96 formed by the length adjuster 81 is engaged with the rope engaging portion 84 of the starting point hook 80*a*, and the other loop portion 96 is engaged with that of the end point hook 80*b* to form a rope-stretched shape. When at least one intermediate point hook 80*c* is provided between the starting point hook 80*a* and the end point hook 80*b*, the rope 76 is also engaged with the rope engaging portion 84 of the intermediate point hook 80*c* in a unicursal manner to form a desired rope-stretched shape.

The formation of a rope-stretched shape will be described by taking the assemblable frame in FIG. 32 as an example. In FIG. 32, one hook 80 is attached to each of the regions of the pair of column frame members 72 corresponding to the first frame 77, and six hooks 80 are attached in the horizontal direction to each of the upper frame member 73 and the intermediate frame member 74 corresponding to the first frame 77. A total of 14 hooks 80 are attached to the first frame 77 such that their rope engaging portions 84 are all located on the inner surface side of the first frame 77.

In this state, the rope 76 is strung in the lateral direction between a pair of hooks 80 located on the column frame members 72. Regarding 12 hooks 80 on the upper frame member 73 and the intermediate frame member 74 corresponding to the first frame 77, two adjacent hooks 80 on the upper frame member 73 are used as the starting point hook 80*a* and the end point hook 80*b*, respectively. Two hooks 80 engaged with the intermediate frame member 74 at opposite locations are each used as the intermediate point hook 80*c*. The rope 76 is sequentially engaged with the hooks 80 in a unicursal manner. As a result, a rope-stretched shape, in which one horizontal rope and six vertical ropes are stretched, can be formed in the first frame 77.

In addition, one hook 80 is attached to each of the regions of the pair of column frame members 72 and the intermediate frame member 74 corresponding to the second frame 78, and two hooks 80 are attached to the lower frame member 75. The rope 76 is then stretched diagonally between the hooks 80, and a plurality of loop portions 96 are engaged with the rope engaging portions 84 of the hooks 80 to form a star-shaped polygonal rope-stretched shape.

(4) If there is an excess length of the rope 76 in forming a rope-stretched shape, correcting the slackness of the rope 76 and adjusting the degree of tension of the rope 76 can be easily performed by adjusting the length of the doubled portion of the rope with the length adjuster 81. In addition, if it is desired to modify the rope-stretched shape after the assemblable frame 1 is assembled, it can be changed and adjusted as needed by adding or removing the hooks 80, by changing the way the rope 76 is stretched, or the like.

(5) Furthermore, since the assemblable frame 1 can be disassembled into the pole members 10 and the joining members, the disassembled members can be used to form a new assemblable frame 1 having a different shape. Additionally, the hooks 80 can also be used for the assemblable frame 1 in the new shape, since they are also configured to be removably attached to the pole through portions 11 of the pole members 10.

Note that the assemblable frame of the fifth embodiment can be configured with or without the joining members 20, 40, 50, 60 described in the first to fourth embodiments. In these cases as well, the assemblable frame is constructed by combining a plurality of pole members each having a plurality of pole through portions. Examples of such an assemblable frame include:

an assemblable frame, comprising:
- a pole member having a plurality of pole through portions;
- a plurality of hooks;
- a rope; and
- a length adjuster for the rope, wherein
- the rope is formed into a rope-stretched shape with the hooks,
- the pole through portions are arranged at regular intervals in the longitudinal direction of the pole member, and
- the hooks each have an insertion portion removably inserted into one of the pole through portions and a rope engaging portion extending from the insertion portion.

Examples of the method of manufacturing such an assemblable frame include:

- a method of manufacturing an assemblable frame including a pole member having a plurality of pole through portions, a plurality of hooks, and a rope, the method comprising: stretching the rope into a rope-stretched shape with the hooks, wherein
- the pole through portions are arranged at regular intervals in the longitudinal direction of the pole member,
- the hooks each have an insertion portion removably inserted into one of the pole through portions and a rope engaging portion extending from the insertion portion,
- the hooks include a starting point hook, an end point hook, and at least one intermediate point hook, and
- the rope is engaged with the rope engaging portion of the intermediate point hook in a unicursal manner to form the rope-stretched shape.

Although specific embodiments of the invention have been described and illustrated, it is to be understood that the invention is not to be limited to the embodiments disclosed herein. As would be apparent to those skilled in the art, various changes, modifications, and alterations may be made within the scope of the invention as defined in the appended claims.

According to the embodiments, pole members can be easily and reliably connected regardless of the number of pole members using joining members of one form. Therefore, the assemblable frame using the joining members can be applied to various items having an assembled frame structure, such as goal sets for football and other ball games, targets for baseball and golf practice, shelves, stands, storage boxes, chairs, tables, and playground equipment (swings, jungle gyms, etc.), and thus is industrially useful.

The invention claimed is:

1. A joining member configured to connect a plurality of pole members, comprising:

a first support portion that is configured to support a first pole member in a longitudinal direction thereof at a bottom surface of the first support portion;

a second support portion that is configured to support a second pole member in a longitudinal direction thereof at a bottom surface of the second support portion;

a first contact portion that is disposed only on one side of the first support portion along the longitudinal direction of the first pole member and is configured to contact the first pole member at a side surface of the first contact portion; and a second contact portion that is disposed only on one or another side of the second support portion along the longitudinal direction of the second pole member and is configured to contact the second pole member at a side surface of the second contact portion, wherein the bottom surface of the second support portion is connected so as to intersect the bottom surface of the first support portion at an angle and forms a reflex angle with the bottom surface of the first support portion, wherein the first support portion and the second support portion each have at least one through portion and one convex portion in their respective bottom surfaces, and the first contact portion and the second contact portion each have at least one through portion and one convex portion in their respective side surfaces.

2. The joining member according to claim 1, wherein the first support portion, the second support portion, the first contact portion, and the second contact portion are each formed in a flat plate shape.

3. The joining member according to claim 1, wherein the first support portion, the second support portion, the first contact portion, and the second contact portion are each formed in a curved plate shape.

4. The joining member according to claim 1, further comprising a reinforcement portion arranged so as to diagonally connect inner surfaces of the first support portion and the second support portion on a minor angle side.

5. An assemblable frame, comprising:

a plurality of pole members; and the joining member as set forth in claim 1, which connects the pole members.

6. The assemblable frame according to claim 5, wherein the pole members each have pole through portions each passing through a pair of opposing surfaces and intersecting another through portion in a cross-sectional view, and the pole through portions of the pole members each correspond to the through portions of the joining member when the pole members are assembled with the joining member.

7. The assemblable frame according to claim 5, further comprising a plurality of hooks, wherein the pole members each have a plurality of pole through portions, the hooks are engaged with the pole through portions, and a rope is stretched between the hooks and engaged therewith to form a rope-stretched shape, and the hooks each include:

an insertion portion configured to be removably inserted into one of the pole through portions; and a rope engaging portion extending from the insertion portion.

8. The assemblable frame according to claim 7, wherein for each hook the insertion portion is provided with a swing piece, and the swing piece is elastically deformable so that the insertion portion can be in a state of being engaged with the one of the pole through portions and a state of being disengaged therefrom.

9. The assemblable frame according to claim 8, further comprising a length adjuster provided on the rope stretched between the hooks.

10. The assemblable frame according to claim 7, further comprising a length adjuster provided on the rope stretched between the hooks.

* * * * *